(12) United States Patent
Blatherwick et al.

(10) Patent No.: US 9,429,490 B2
(45) Date of Patent: Aug. 30, 2016

(54) SYSTEMS AND RELATED METHODS FOR INSTALLING OR REPLACING A PROCESS MEASUREMENT INSTRUMENT

(71) Applicant: Ashcroft, Inc., Stratford, CT (US)

(72) Inventors: Christian Miles Blatherwick, Stratford, CT (US); Richard C. Diaz, Ansonia, CT (US)

(73) Assignee: Ashcroft, Inc., Stratford, CT (US)

( * ) Notice: Subject to any disclaimer, the term of this patent is extended or adjusted under 35 U.S.C. 154(b) by 189 days.

(21) Appl. No.: 14/244,372

(22) Filed: Apr. 3, 2014

(65) Prior Publication Data

US 2015/0285700 A1   Oct. 8, 2015

(51) Int. Cl.
| | | |
|---|---|---|
| *G01L 9/00* | (2006.01) | |
| *G01L 19/00* | (2006.01) | |
| *G01L 19/16* | (2006.01) | |

(Continued)

(52) U.S. Cl.
CPC .............. *G01L 9/00* (2013.01); *G01L 19/003* (2013.01); *G01L 19/16* (2013.01); *G01F 1/05* (2013.01); *G01F 15/18* (2013.01); *G01F 15/185* (2013.01); *G01L 7/182* (2013.01); *Y10T 29/49771* (2015.01); *Y10T 29/49776* (2015.01); *Y10T 29/49817* (2015.01)

(58) Field of Classification Search
CPC ....... G01L 9/00; G01L 19/16; G01L 19/003; G01L 7/182; Y10T 29/49771; Y10T 29/49776; Y10T 29/49817; G01F 15/185; G01F 7/182; G01F 1/05; G01F 15/18
See application file for complete search history.

(56) References Cited

U.S. PATENT DOCUMENTS 3,163,529 A   12/1964   Jewett
3,563,095 A    2/1971   Robinson, Jr.

(Continued)

FOREIGN PATENT DOCUMENTS

DE   WO2005/098368   * 10/2005
WO   WO 2014/035243      3/2014

OTHER PUBLICATIONS

Snap-tite 71 Series, High Pressure, Push-to-Connect Non Spill-Quick Couplings, Parker Hannifin Corporation, available at www.parker.com/quickcouplings, May, 2013.

(Continued)

*Primary Examiner* — John C Hong
(74) *Attorney, Agent, or Firm* — McCarter & English, LLP

(57) ABSTRACT

The present disclosure provides improved process measurement assemblies and methods for replacing/installing devices/instruments (e.g., gauges, digital gauges, transducers, switches, etc.) associated with process measurement assemblies. More particularly, the present disclosure provides improved process measurement assemblies (e.g., diaphragm seal assemblies or isolation ring assemblies) having couplings (e.g., dry-break couplings) that allow a user to replace and/or install process measurement instruments/devices to and/or from the process measurement assemblies, and related methods of use. In general, the present disclosure provides for improved systems/methods for installing or replacing a process measurement instrument to and/or from process measurement assemblies (e.g., diaphragm seal assemblies or isolation ring assemblies). In exemplary embodiments, the present disclosure provides for a system/method for installing/replacing a process measurement instrument wherein the process operating under pressure is a flow stream process, the flow stream process having a solids content.

21 Claims, 26 Drawing Sheets

(51) Int. Cl.
  *G01F 1/05*   (2006.01)
  *G01F 15/18*  (2006.01)
  *G01L 7/18*   (2006.01)

(56) References Cited

U.S. PATENT DOCUMENTS

| | | |
|---|---|---|
| 3,645,139 A | 2/1972 | Zavoda |
| 3,797,317 A | 3/1974 | Peterson, Jr. |
| 4,082,002 A | 4/1978 | Baugh |
| 4,109,535 A | 8/1978 | Reed et al. |
| 4,192,192 A | 3/1980 | Schnell |
| 4,218,926 A | 8/1980 | DeVisser |
| 4,534,224 A | 8/1985 | Raftis |
| 4,577,511 A | 3/1986 | Wetzel |
| 4,598,581 A | 7/1986 | Brekke |
| 4,763,527 A | 8/1988 | Raftis |
| 4,840,068 A | 6/1989 | Mayhew, Jr. |
| 4,884,452 A | 12/1989 | Kaiser |
| 5,022,271 A | 6/1991 | Hannon, Jr. |
| 5,154,083 A | 10/1992 | Bernstein et al. |
| 5,605,360 A | 2/1997 | Kurisaki et al. |
| 5,708,201 A | 1/1998 | Kaub |
| 5,708,210 A | 1/1998 | Gardellin |
| 5,711,508 A | 1/1998 | Schreiber et al. |
| 6,520,022 B1 | 2/2003 | Anderson et al. |
| 7,047,811 B2 | 5/2006 | Sherman et al. |
| 7,258,017 B1 | 8/2007 | Hedtke |
| 2002/0083977 A1 | 7/2002 | Beck et al. |
| 2006/0278003 A1 | 12/2006 | Bessette et al. |
| 2013/0031984 A1 | 2/2013 | Jones et al. |

OTHER PUBLICATIONS

PCT International Patent Search Report and Written Opinion dated Jul. 10, 2015 for PCT International Patent Application No. PCT/US2015/024008.

* cited by examiner

SYSTEMS AND RELATED METHODS FOR INSTALLING OR REPLACING A PROCESS MEASUREMENT INSTRUMENT

BACKGROUND

1. Technical Field

The present disclosure relates to process measuring assemblies and methods for replacing/installing devices/instruments (gauges, transducers, etc.) associated with process measuring assemblies and, more particularly, to process measuring assemblies (e.g., diaphragm seal assemblies or isolation ring assemblies) having couplings that allow a user to replace and/or install process measurement instruments/devices to and/or from the process measuring assemblies, and related methods of use.

2. Background Art

Process measuring assemblies, such as diaphragm seal assemblies and isolation ring assemblies, have innumerable uses in industry. For example, process measuring assemblies can measure a parameter (e.g., pressure) associated with a process (e.g., a process operating under pressure, such as a flow stream process) by utilizing a measurement instrument (gauges, digital gauges, transducers, switches, etc.) mounted with respect to the measuring assembly. Process measuring assemblies are useful in a myriad of different environments (e.g., for commercial and industrial applications).

In general, process measuring assemblies (e.g., diaphragm seal assemblies or isolation ring assemblies) or the like are known. Some exemplary process measuring assemblies and related accessories or the like are described and disclosed in U.S. Pat. Nos. 3,645,139; 4,109,535; 4,192,192; 4,218,926; 4,534,224; 4,763,527; 4,884,452; 5,022,271; 5,708,210 and 7,047,811, the entire contents of each being hereby incorporated by reference in their entireties.

Price competition between the various process measuring assembly manufacturers is a factor in the marketplace. Therefore, a savings in the cost of material, labor and the like by a manufacturer can have a significant effect on that manufacturer's sales, market share and margins. Therefore, a constant need exists among these manufacturers to develop more cost effective manufacturing/operating techniques. Moreover, a constant need exists among process measuring assembly manufacturers to develop assemblies and related accessories that are cost-effective and/or include improved features/structures.

Thus, an interest exists for improved process measuring assemblies/accessories, and related methods of use. These and other inefficiencies and opportunities for improvement are addressed and/or overcome by the systems, methods and assemblies of the present disclosure.

SUMMARY

The present disclosure provides advantageous process measuring assemblies (e.g., diaphragm seal assemblies or isolation ring assemblies) and methods for replacing/installing devices/instruments associated with process measuring assemblies. More particularly, the present disclosure provides advantageous process measuring assemblies having couplings (e.g., dry-break couplings) that allow a user to replace and/or install process measurement instruments/devices (e.g., gauges, digital gauges, transducers, switches, etc.) to and/or from the process measuring assemblies, and related methods of use.

In exemplary embodiments, the present disclosure provides for improved systems/methods for installing or replacing a process measurement instrument (e.g., pressure measurement instrument or gauge) to and/or from process measuring assemblies (e.g., diaphragm seal assemblies or isolation ring assemblies).

The present disclosure provides for a method for installing/replacing a process measurement instrument including operating a process under pressure; providing a first measurement instrument mounted with respect to a measuring assembly positioned for measuring a parameter associated with the process; removing the first measurement instrument from the measuring assembly while the process operates under pressure; replacing the first measurement instrument with a second measurement instrument while the process operates under pressure by installing/mounting the second measurement instrument with respect to the measuring assembly; wherein the first measurement instrument includes a first coupling that allows a user to remove the first measurement instrument from the measuring assembly while the process operates under pressure without substantial loss of fill or sensing fluid/media from the first measurement instrument; wherein the second measurement instrument includes a second coupling that allows a user to replace the first instrument by mounting the second measurement instrument with respect to the measuring assembly while the process operates under pressure, the second measurement instrument: (i) containing pre-filled sensing fluid/media configured to react to pressure of the process, and (ii) pre-charged to a pre-determined pressure level.

The present disclosure also provides for a method for installing or replacing a process measurement instrument wherein the second measurement instrument is pre-charged to substantially the same pressure of the first measurement instrument prior to installing the second measurement instrument.

The present disclosure also provides for a method for installing or replacing a process measurement instrument wherein the first and second measurement instruments are pressure measurement instruments. The present disclosure also provides for a method for installing or replacing a process measurement instrument wherein the first and second measurement instruments are selected from the group consisting of gauges, digital gauges, transducers and switches.

The present disclosure also provides for a method for installing or replacing a process measurement instrument wherein the first and second couplings are dry-break couplings. The present disclosure also provides for a method for installing or replacing a process measurement instrument wherein the fill or sensing fluid/media of the first measurement instrument is configured to react to pressure of the process when the first measurement instrument is mounted with respect to the measuring assembly.

The present disclosure also provides for a method for installing or replacing a process measurement instrument wherein the measuring assembly is a seal assembly. The present disclosure also provides for a method for installing or replacing a process measurement instrument wherein the measuring assembly is an isolation ring assembly or an isolation spool assembly. The present disclosure also provides for a method for installing or replacing a process measurement instrument wherein the measuring assembly is a diaphragm seal assembly.

The present disclosure also provides for a method for installing or replacing a process measurement instrument wherein the process operating under pressure is a flow stream process, the flow stream process having a solids content.

The present disclosure also provides for a method for installing or replacing a process measurement instrument wherein the measuring assembly includes a third coupling that allows the user to: (i) couple the first coupling to the third coupling to mount the first measurement instrument with respect to the measuring assembly, or (ii) couple the second coupling to the third coupling to mount the second measurement instrument with respect to the measuring assembly; and wherein the third coupling is a dry-break coupling.

The present disclosure also provides for a method for installing or replacing a process measurement instrument wherein the fill or sensing media is a sensing fluid; and wherein the pre-filled sensing media is a sensing fluid.

The present disclosure also provides for a method for installing or replacing a process measurement instrument further including a needle valve mounted with respect to the measuring assembly, and a third coupling mounted with respect to the needle valve; and wherein the third coupling allows the user to: (i) couple the first coupling to the third coupling to mount the first measurement instrument with respect to the measuring assembly, or (ii) couple the second coupling to the third coupling to mount the second measurement instrument with respect to the measuring assembly.

The present disclosure also provides for a method for installing or replacing a process measurement instrument wherein the fill or sensing media includes glycerin or silicone.

The present disclosure also provides for a method for installing or replacing a process measurement instrument wherein the measuring assembly includes a housing with a flexible member exposed to the process, the housing containing fill or sensing media; and wherein the fill or sensing media of the housing is configured to react to pressure introduced to the flexible member.

The present disclosure also provides for a method for installing/replacing a process measurement instrument including operating a process under pressure; providing a first pressure measurement instrument mounted with respect to a measuring assembly positioned for measuring pressure associated with the process; removing the first pressure measurement instrument from the measuring assembly while the process operates under pressure; replacing the first pressure measurement instrument with a second pressure measurement instrument while the process operates under pressure by installing and mounting the second pressure measurement instrument with respect to the measuring assembly; wherein the first pressure measurement instrument includes a first coupling that allows a user to remove the first pressure measurement instrument from the measuring assembly while the process operates under pressure without substantial loss of fill or sensing media from the first pressure measurement instrument; wherein the second pressure measurement instrument includes a second coupling that allows the user to replace the first pressure measurement instrument by mounting the second pressure measurement instrument with respect to the measuring assembly while the process operates under pressure, the second pressure measurement instrument: (i) containing pre-filled sensing media configured to react to pressure of the process, and (ii) pre-charged to a pre-determined pressure level; wherein the fill or sensing media of the first measurement instrument is configured to react to pressure of the process when the first measurement instrument is mounted with respect to the measuring assembly; wherein the first and second couplings are dry-break couplings; wherein the measuring assembly includes a third coupling that allows the user to: (i) couple the first coupling to the third coupling to mount the first pressure measurement instrument with respect to the measuring assembly, or (ii) couple the second coupling to the third coupling to mount the second pressure measurement instrument with respect to the measuring assembly; and wherein the third coupling is a dry-break coupling.

The present disclosure also provides for a method for installing/replacing a process measurement instrument further including a needle valve mounted with respect to the measuring assembly, and wherein the third coupling is mounted with respect to the needle valve. The present disclosure also provides for a method for installing/replacing a process measurement instrument wherein the measuring assembly includes a housing with a flexible member exposed to the process, the housing containing fill or sensing media; and wherein the fill or sensing media of the housing is configured to react to pressure introduced to the flexible member.

The present disclosure also provides for a method for installing/replacing a process measurement instrument including operating a flow stream process under pressure, the flow stream process having a solids content; providing a first pressure measurement instrument mounted with respect to a seal assembly positioned for measuring pressure associated with the flow stream process; removing the first pressure measurement instrument from the seal assembly while the flow stream process operates under pressure; replacing the first pressure measurement instrument with a second pressure measurement instrument while the flow stream process operates under pressure by installing and mounting the second pressure measurement instrument with respect to the seal assembly; wherein the first pressure measurement instrument includes a first coupling that allows a user to remove the first pressure measurement instrument from the seal assembly while the flow stream process operates under pressure without substantial loss of fill or sensing media from the first pressure measurement instrument; wherein the second pressure measurement instrument includes a second coupling that allows the user to replace the first pressure measurement instrument by mounting the second pressure measurement instrument with respect to the seal assembly while the flow stream process operates under pressure, the second pressure measurement instrument: (i) containing pre-filled sensing media configured to react to pressure of the flow stream process, and (ii) pre-charged to a pre-determined pressure level; wherein the seal assembly includes a housing with a flexible member exposed to the flow stream process, the housing containing fill or sensing media; wherein the fill or sensing media of the housing is configured to react to pressure introduced to the flexible member; wherein the fill or sensing media of the first measurement instrument is configured to react to pressure of the flow stream process when the first measurement instrument is mounted with respect to the seal assembly; wherein the seal assembly includes a third coupling that allows the user to: (i) couple the first coupling to the third coupling to mount the first pressure measurement instrument with respect to the seal assembly, or (ii) couple the second coupling to the third coupling to mount the second pressure measurement instrument with respect to the seal assembly; and wherein the first, second and third couplings are dry-break couplings; and wherein the second pressure measurement instrument is pre-charged to substantially the same pressure of the first pressure measurement instrument prior to installing the second pressure measurement instrument.

The present disclosure also provides for a method for installing/replacing a process measurement instrument further including a needle valve mounted with respect to the seal assembly, and wherein the third coupling is mounted with respect to the needle valve. The present disclosure also provides for a method for installing/replacing a process measurement instrument wherein the seal assembly includes a housing with a flexible member exposed to the process, the housing containing fill or sensing media; and wherein the fill or sensing media of the housing is configured to react to pressure introduced to the flexible member.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, methods and assemblies, reference is made to the appended figures, wherein.

DETAILED DESCRIPTION

Figure 1:
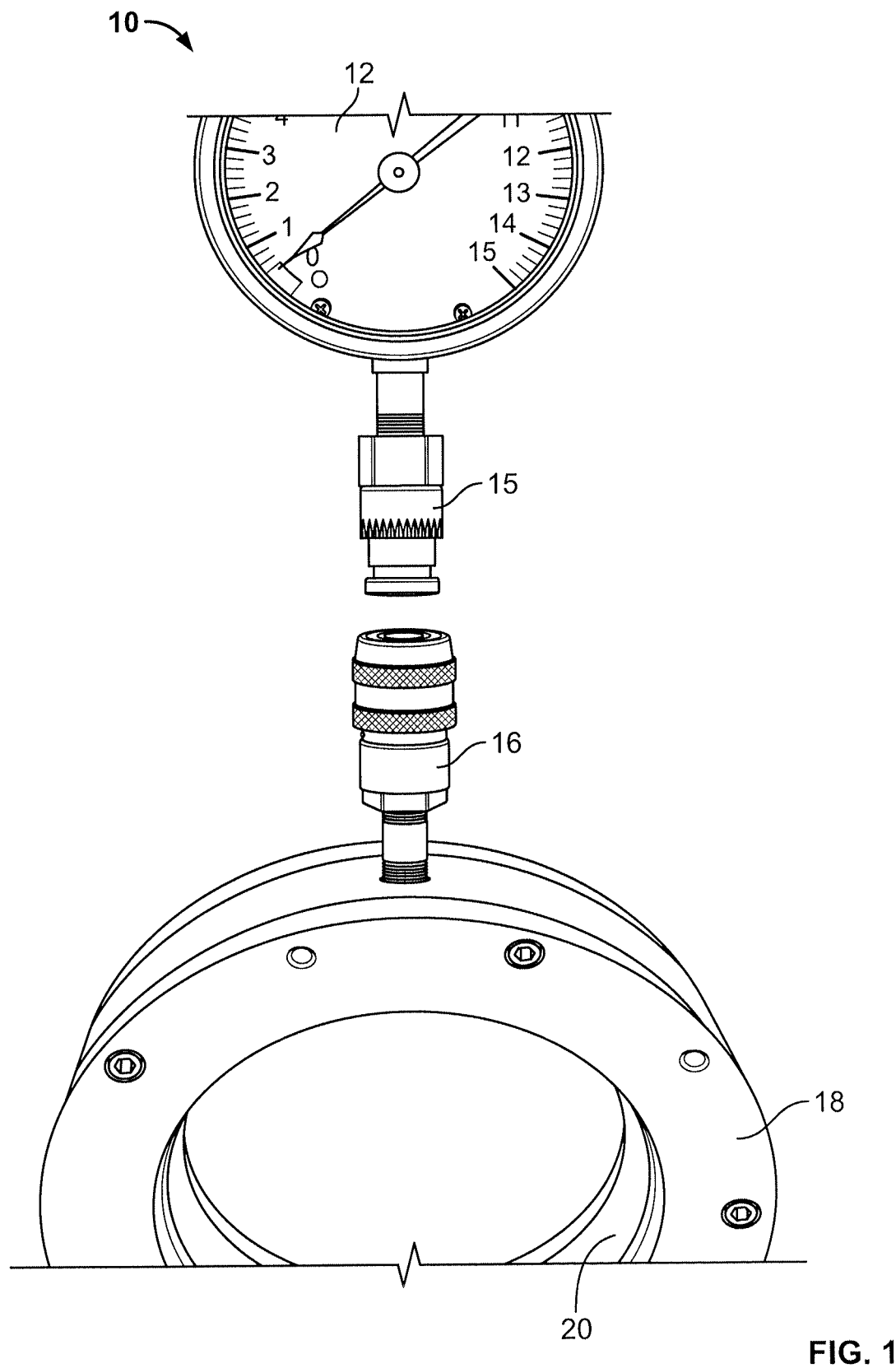
FIG. 1 is a partial front perspective view of an exemplary measuring assembly and measurement instrument according to the present disclosure, prior to assembly.

The exemplary embodiments disclosed herein are illustrative of advantageous process measuring assemblies/components, and exemplary systems and of the present disclosure and methods/techniques thereof. It should be understood, however, that the disclosed embodiments are merely exemplary of the present disclosure, which may be embodied in various forms. Therefore, details disclosed herein with reference to exemplary process measuring assemblies or fabrication methods and associated processes or techniques of assembly and use are not to be interpreted as limiting, but merely as the basis for teaching one skilled in the art how to make and use the advantageous assemblies/systems and/or alternative assemblies/systems of the present disclosure.

The present disclosure provides improved process measuring assemblies and methods for replacing/installing devices/instruments (e.g., gauges, digital gauges, transducers, switches, etc.) associated with process measuring assemblies. More particularly, the present disclosure provides improved process measuring assemblies (e.g., diaphragm seal assemblies or isolation ring assemblies) having couplings (e.g., dry-break couplings) that allow a user to replace and/or install process measurement instruments/devices to and/or from the process measuring assemblies, and related methods of use. In general, the present disclosure provides for improved systems/methods for installing or replacing a process measurement instrument (gauge, transducer, etc.) to and/or from process measuring assemblies.

In exemplary embodiments, the present disclosure provides for utilizing advantageous couplings (e.g., quick connect/disconnect dry-break couplings/fittings) positioned/mounted between the measuring/seal assembly (e.g., isolation ring assembly or diaphragm seal assembly) and the measurement instrument (e.g., the gauge, or other mounted instrument such as a pressure transducer) for installing or replacing process a measurement instrument to/from the process measuring assembly.

In exemplary embodiments, the present disclosure provides for a method for installing or replacing a process measurement instrument including: operating a process under pressure; providing a first measurement instrument mounted with respect to a measuring assembly positioned for measuring a parameter associated with the process; removing the first measurement instrument from the measuring assembly while the process operates under pressure; replacing the first measurement instrument with a second measurement instrument while the process operates under pressure by installing and mounting the second measurement instrument with respect to the measuring assembly; wherein the first measurement instrument includes a first coupling that allows a user to remove the first measurement instrument from the measuring assembly while the process operates under pressure without substantial loss of fill or sensing fluid/media from the first measurement instrument; wherein the second measurement instrument includes a second coupling that allows a user to replace the first measurement instrument by mounting the second measurement instrument with respect to the measuring assembly while the process operates under pressure, the second measurement instrument: (i) containing pre-filled sensing fluid/media configured to react to pressure of the process, and (ii) pre-charged to a pre-determined pressure level.

In certain embodiments, the first and second couplings are dry-break couplings or the like (e.g., safe quick release dry-break couplings). In some embodiments, the measuring assembly includes a third coupling that allows the user to: (i) couple the first coupling to the third coupling to mount the first measurement instrument with respect to the measuring assembly, or (ii) couple the second coupling to the third coupling to mount the second measurement instrument with respect to the measuring assembly. In example embodiments, the third coupling is a dry-break coupling or the like.

It is noted that the second measurement instrument can be pre-charged to a pre-determined pressure level prior to installing/mounting the second measurement instrument. For example and in certain embodiments, the second measurement instrument can be pre-charged to substantially the same pressure of the first measurement instrument (as mounted, and during its operation) prior to removing the first instrument and prior to installing the second measurement instrument. The first and second measurement instruments can be pressure measurement instruments (e.g., gauges, digital gauges, transducers, switches, etc.).

In general, the fill or sensing fluid/media (e.g., pressure-conveyance media) of the first measurement instrument can be configured to react to pressure of the process when the first measurement instrument is mounted with respect to the measuring assembly. For example, the process operating under pressure can a flow stream process, with the flow stream process having a solids content.

In certain embodiments, the measuring assembly is an isolation ring assembly or the like, and is used as an accessory for pressure measurement in flow stream applications where there are high solids content that might cause clogging of the flow stream and/or piping. As discussed further below in conjunction with the figures, the isolation ring assembly can have an inner flexible ring or member that is mounted substantially flush to the process and prevents clogging of the process/piping. In some embodiments, the measuring assembly includes a flanged metallic ring lined with an inner flexible wall, although the present disclosure is not limited thereto. The inner flexible wall can be mounted flush to the process, which prevents clogging of the process media (e.g., sewage, mining by-products, paper/pulp processing, etc.).

In exemplary embodiments, the measuring assembly is a seal assembly. For example, the measuring assembly can be an isolation ring assembly (e.g., wafer design or bolt-thru design), or an isolation spool assembly (e.g., threaded isolation spool or flanged isolation spool), or it can be a diaphragm seal assembly or the like, as discussed further below. As noted above, exemplary process measuring assemblies or the like are described and disclosed in U.S. Pat. Nos. 3,645,139; 4,109,535; 4,192,192; 4,218,926; 4,534,224; 4,763,527; 4,884,452; 5,022,271; 5,708,210 and 7,047,811.

In general and as discussed further below, the process measuring/seal assembly (e.g., diaphragm seal assembly or isolation ring assembly) is configured and dimensioned to provide a means to measure a condition (e.g., pressure) of a process, while protecting the measurement instrument associated with the measuring assembly from harmful process media (e.g., corrosive process media, or media that could freeze or clog, etc.). These issues can have damaging effects, ranging from inaccurate measurements to catastrophic instrument failures.

In general, a measuring/seal assembly can include a housing with a flexible diaphragm/membrane attached (which is exposed to the process), an instrument attached or mounted with respect to the top of the housing, and a fill fluid/media inside which reacts to pressure introduced on or to the diaphragm/membrane. For proper use, and to ensure no damage is done to the assembly when pressurized, it is important to ensure that a proper vacuum fill has been performed so substantially no air bubbles are trapped inside the assembly/system.

Current practice provides that it is not uncommon for a measurement instrument (e.g., gauge) to fail or fall out of its calibration specification, at which point it needs replacing. Typically, when a measurement instrument is replaced, it is important to ensure the entire measuring/seal assembly is properly filled (with sensing fluid/media) prior to reuse. One way to attempt to ensure proper system fill is to remove the complete assembly from the line and perform a vacuum fill; however this is very time consuming and labor intensive. To avoid this complete removal, some manufacturers offer instrument removal devices, which can provide users the ability to remove the instrument without removing the measuring/seal assembly. A downside of these instrument removal devices is that they require either a process shutdown to remove the measurement instrument, or a manual fill is required for the measurement instrument; both of which leave the measurement instrument and/or isolator assembly (measuring/seal assembly) susceptible to fluid loss or air inclusion.

Some manufacturers offer a needle valve welded to the housing of the measuring assembly, which typically can allow the user to remove the measurement instrument from the measuring assembly. However, such devices do not allow these manufacturers to offer a pre-filled measurement instrument, and therefore the customer must manually fill the measurement instrument prior to reinstallation to the measuring assembly. Such manual fill and/or installation methods provide the potential for fluid loss and/or air inclusion (of the measurement instrument and/or measuring/seal assembly).

Other manufacturers off a stinger module, which sometimes allows the supplier to offer pre-filled gauges. However, the male connection is not robust and is easily damaged, and the user must turn off the process to replace the measurement instrument. Moreover, the measurement instrument is still susceptible to fluid loss and/or air inclusion if installed too slowly or improperly.

In exemplary embodiments, the present disclosure provides for improved systems/methods for installing or replacing process measurement instruments to and/or from process measuring assemblies by utilizing advantageous couplings positioned between the measuring assemblies and the measurement instruments, thereby providing significant operational, manufacturing and commercial advantages as a result. Additionally, the improved systems/methods of the present disclosure also provides the robust ability to remove a measurement instrument while the process is under pressure (e.g., around 300 psi), and offer a measurement instrument that is not only pre-filled with the proper fluid/media, but also "pre-charged" to a desired level (e.g., to substantially the same pressure at which the previous instrument was removed). This thereby substantially eliminates the possibility of improper fills and/or installations of measurement instruments, which can cause fluid loss and/or air inclusion that lead to accuracy errors or seal damage. These added benefits of the systems/methods of the present disclosure also provide users with significant operational, manufacturing and/or commercial advantages as a result.

As discussed further below, an exemplary dry-break coupling of the present disclosure (e.g., a flush-face dry-break hydraulic quick connect/disconnect coupling available from Parker Snap-tite, Series 71 or the like) includes plumbing connections, and its valve, which has a seal on both sides, is designed to provide sufficient flow while maintaining a low pressure drop when disconnected, as well as preventing fluid loss and air inclusion. It is noted that the coupling can be used in hydraulic or chemical service where cleanliness is required, or applications where spillage cannot be tolerated due to the high value of the fluid or environmental regulations.

Some other advantageous benefits of the systems/methods of the present disclosure include, without limitation: (i) utilizing the exemplary couplings and related methods with respect to a wide range of measuring/seal assemblies, and allowing users to interchange measurement instruments between various types of measuring/seal assemblies, (ii) allowing the measurement instrument to be rotated 360 degrees by hand for viewing and measurement taking needs, (iii) existing measurement instruments can be replaced by any other suitable type of instrument with a similar internal volume, (iv) measurement instruments can be removed/attached several times without concern of fluid loss or accuracy impediment, and/or (v) exemplary sleeve-lock features (discussed below) of the couplings prevent unintentional removal of the measurement instruments.

As will be appreciated, the advantageous abilities/features of the systems/methods of the present disclosure combined with the importance of proper field serviceability in the measuring assembly (diaphragm seal) market are very valuable.

Referring now to the drawings, like parts are marked throughout the specification and drawings with the same reference numerals, respectively. Drawing figures are not necessarily to scale and in certain views, parts may have been exaggerated for purposes of clarity.

Figure 2:
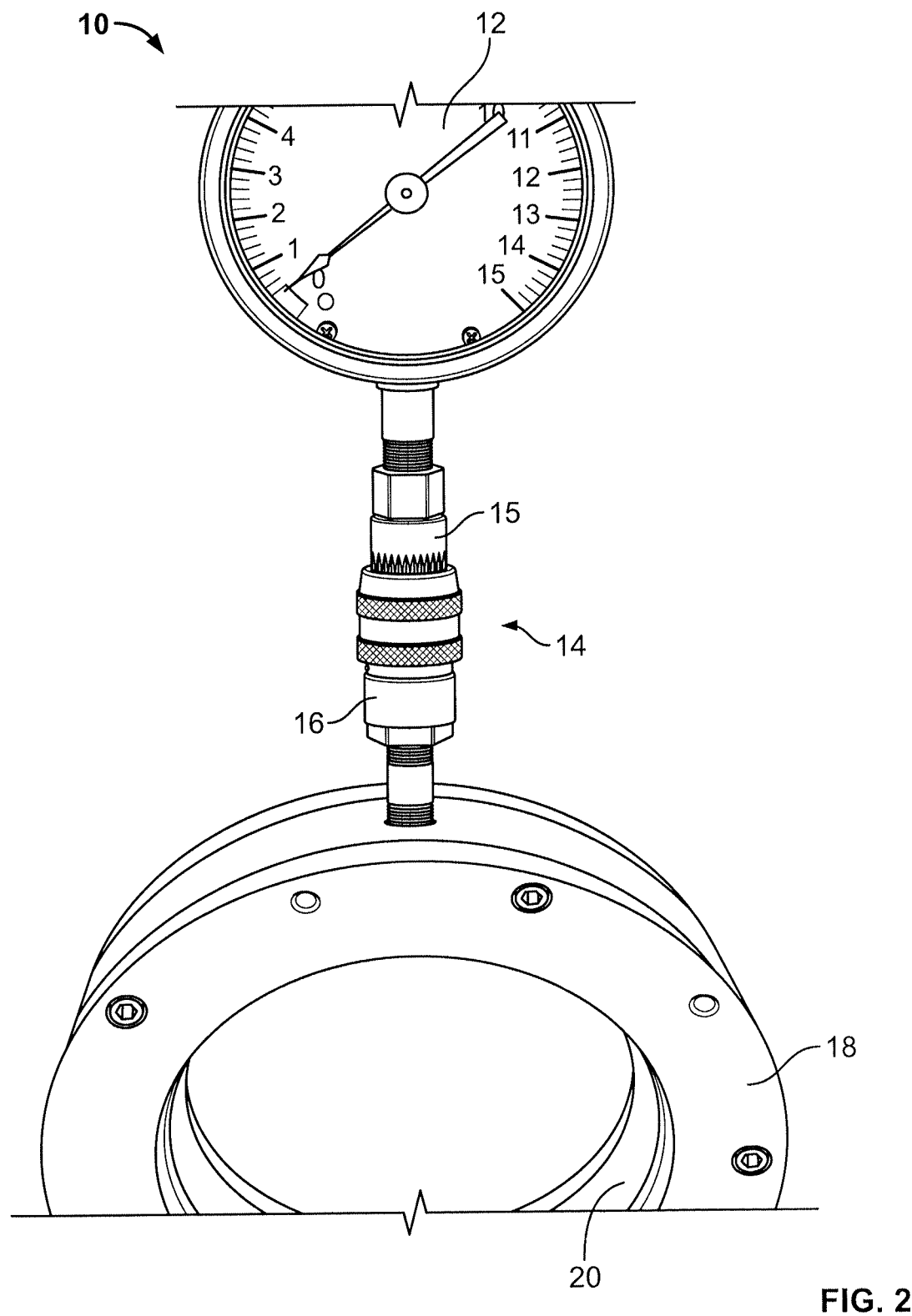
FIG. 2 is a partial front perspective view of the measuring assembly and measurement instrument of FIG. 1, after assembly.
Figure 3:
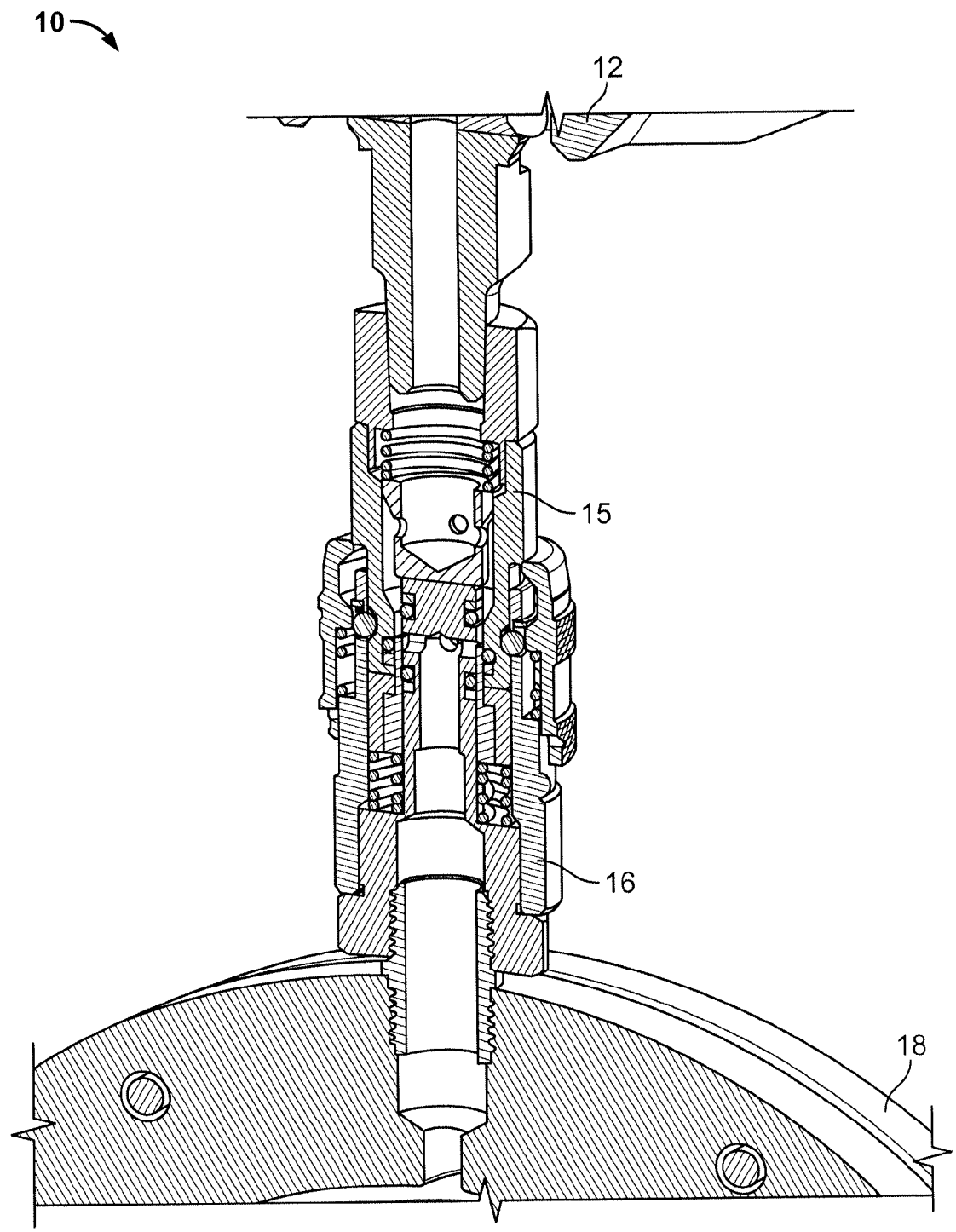
FIG. 3 is a partial cross-sectional view of the assembly of FIG. 2.

As shown in FIGS. 1-3, there is illustrated a measuring assembly 10 depicting an embodiment of the present disclosure. In general, measuring assembly 10 (or 100, below) is a seal/isolator assembly (e.g., diaphragm seal assembly or isolation ring assembly), and is configured and dimensioned to provide a means to measure a condition (e.g., pressure) of a process (e.g., via fill or sensing media 22, diaphragm/membrane 20, and instrument 12—discussed below), while protecting the measurement instrument 12 associated with the measuring assembly 10 from harmful process media (e.g., corrosive process media, or media that could freeze or clog, etc.). These issues can have damaging effects, ranging from inaccurate measurements to catastrophic instrument 12 failures.

In general, a measuring/seal assembly 10, 100 includes a housing 18, 118 with a flexible diaphragm/membrane/member 20 attached or mounted therewith (which is exposed to the process/piping), a measurement instrument 12, 12', 112 attached or mounted with respect to the measuring assembly 10 (e.g., to the top of the housing 18, 118), and a fill or sensing media 22 (e.g., sensing fluid) inside (of the assembly 10) which reacts to pressure introduced on the diaphragm/membrane 20 (via the process/piping). In exemplary embodiments and for proper use, and to ensure substantially no damage is done to the assembly 10, 100 when pressurized, it is important to ensure that a proper vacuum fill has been performed so substantially no air bubbles are trapped inside the assembly/system 10, 100. Fill or sensing media 22 (e.g., pressure-conveyance media) may be composed of glycerin, silicone, or any other appropriate fluid or the like for conveying pressure.

It is noted that measurement instrument 12, 12', 112 can take a variety of forms (mechanical gauges 12, 12', digital gauges 112, transducers, switches, etc.). In certain embodiments, measurement instrument 12, 12', 112 is a pressure measurement instrument or the like. It is noted that measurement instruments 12, 12' and/or 112 are not the only measurement instruments that could be used in accordance with the principles of the present disclosure, as will be readily apparent to persons skilled in the art from the description provided herein.

In general and as shown in FIGS. 1-14, measurement instrument 12 (or 12', 112) is configured and dimensioned to be mounted with respect to measuring assembly 10 (or 100), via coupling assembly 14. Coupling assembly 14 typically includes a first coupling member 15, and a second coupling member 16, as discussed further below.

As shown in FIGS. 1-3, exemplary measuring assembly takes the form of an isolation ring assembly 10 (e.g., pressure monitoring isolating assembly). Assembly 10 is configured and dimensioned to measure/monitor the pressure of fluid in a process/pipeline, and to minimize the risk of losing fill or sensing media 22 (e.g., pressure sensing fluid) when an attached instrument 12 (e.g., pressure gauge) is removed therefrom or attached thereto. In general, assembly 10 is configured and dimensioned to measure/monitor the flow of fluid through a process/pipeline at a desired position along the pipeline/process.

In exemplary embodiments, assembly 10 includes an annular housing 18 that is adapted to be positioned between two flanges of a pipeline and connected thereto. A flexible ring 20 (e.g., a rubber ring or the like) is received in the housing 18. The flexible ring 20 has an inner diameter substantially equal to the diameter of the pipeline. A chamber is formed in the annular housing 18. The chamber is filled with a fill or sensing media 22 (e.g., sensing fluid) and has a measurement instrument 12 (e.g., pressure gauge) associated therewith. As process media/fluid travels through the pipeline and between the annular housing 18, fluid is forced against the flexible element/member 20, which in turn places pressure on the fill or sensing media 22 in the chamber of the assembly 10. The instrument 12 is used to take a reading of this pressure.

In general, the measuring assembly 10 isolates the instrument 12 from the fluid that passes through the process/pipeline. Such isolation is important as the composition, temperature or pressure of the fluid can permanently damage the instrument 12. The advantageous assemblies 10, 100 of the present disclosure are configured and dimensioned to prevent the fill or sensing media 22 from being sprayed out of its associated chamber when the pressure gauge 12 is removed from the assemblies 10, 100.

Figure 12:
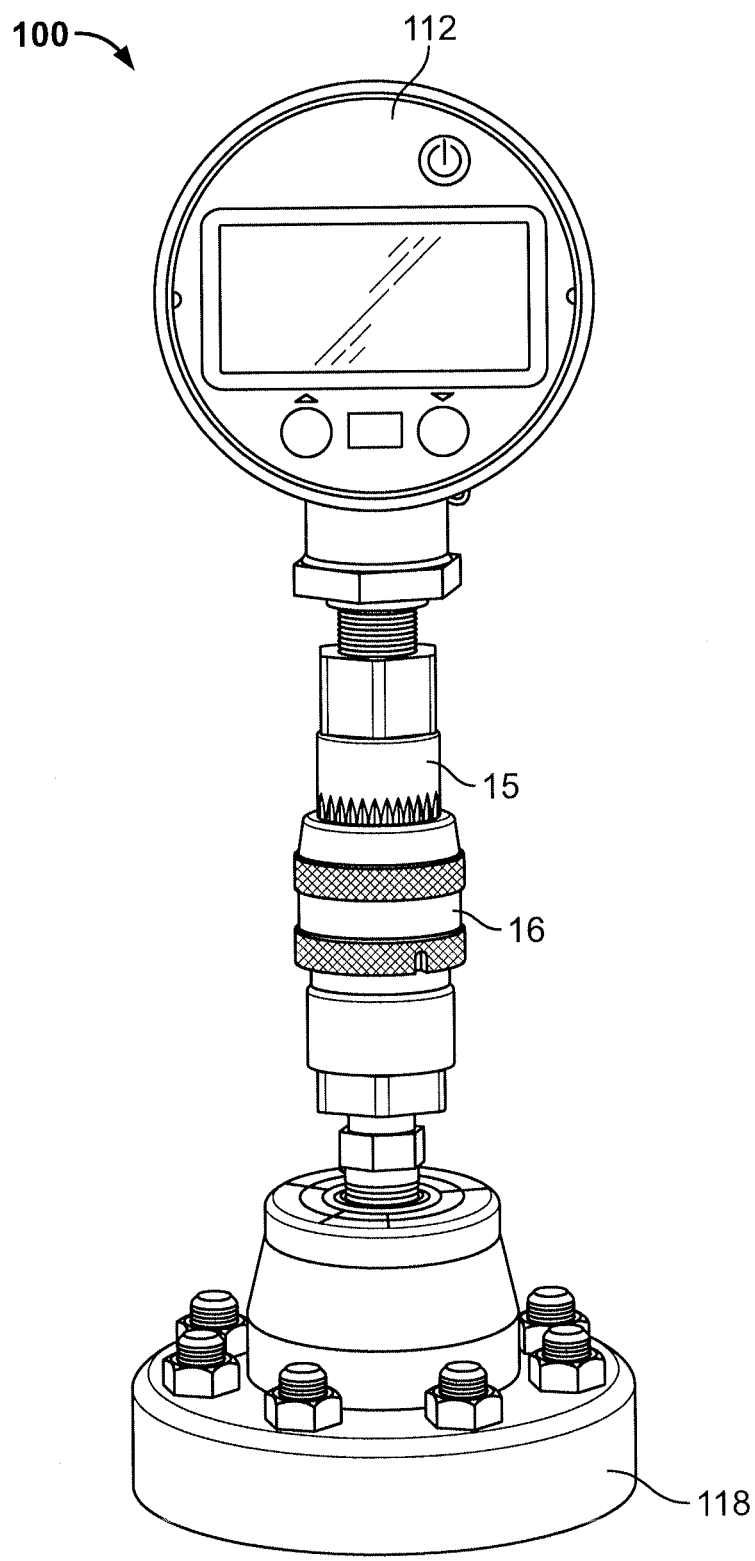
FIG. 12 is a partial front perspective view of another exemplary measuring assembly and measurement instrument according to the present disclosure, after assembly.
Figure 13:
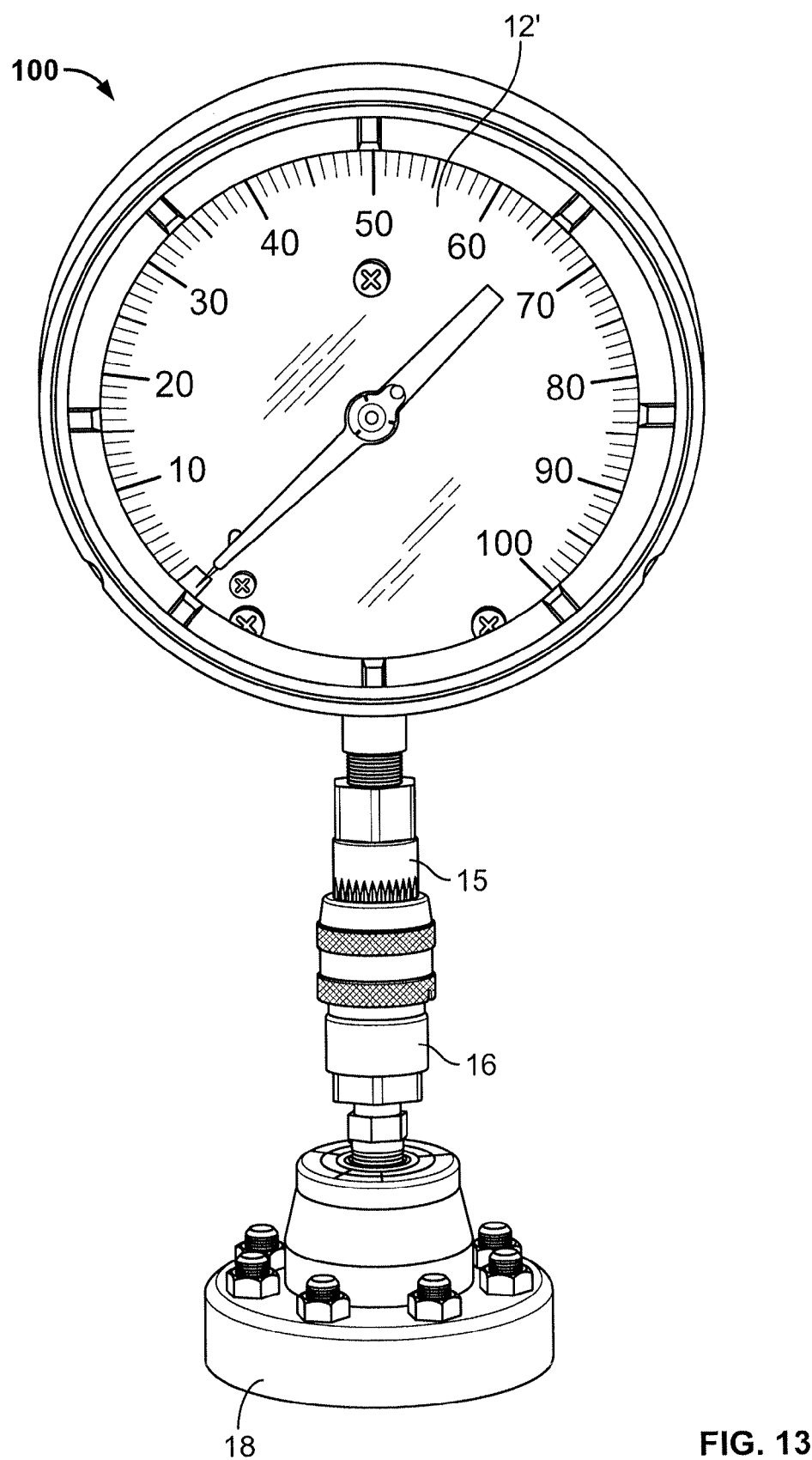
FIG. 13 is a partial front perspective view of another exemplary measuring assembly and measurement instrument according to the present disclosure, after assembly.
Figure 14:
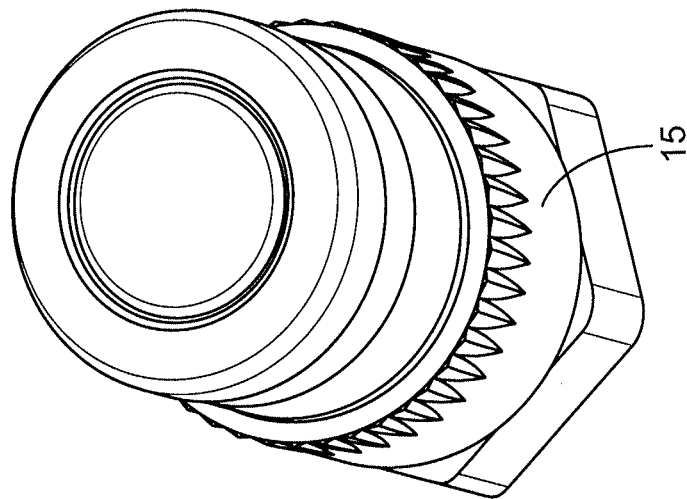
FIG. 14 is a top view of exemplary coupling members of the present disclosure.
Figure 14:
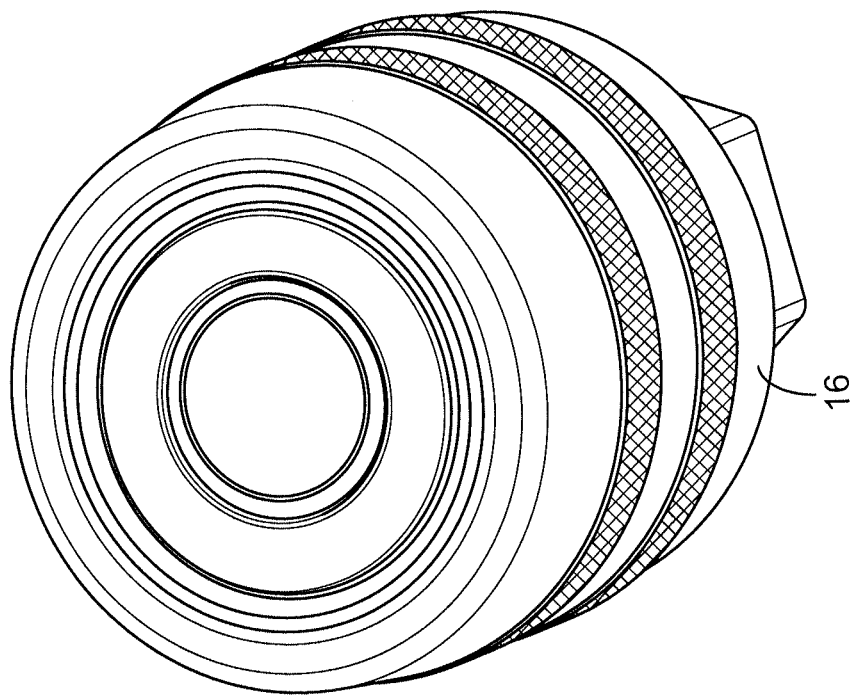

As shown in FIGS. 12-13, an alternative measuring assembly 100 takes the form of a diaphragm seal assembly 100. Similar to assembly 10, assembly 100 is configured and dimensioned to measure/monitor the pressure of fluid in a process/pipeline, and to minimize the risk of losing fill or sensing media 22 when an attached instrument 12, 12', 112 (e.g., pressure gauge) is removed therefrom or attached thereto. In general, assembly 100 is configured and dimensioned to measure/monitor the flow of fluid through a process/pipeline at a desired position along the pipeline/process. In general and as noted above, assembly 100 includes a housing 118 with a flexible diaphragm/membrane/member (obscured) attached or mounted therewith (which is exposed to the process/piping), a measurement instrument 12, 12', 112 attached or mounted with respect to the measuring assembly 100 (e.g., to the top of the housing 118), and a fill or sensing media 22 (e.g., sensing fluid/media) inside (of the assembly 100) which reacts to pressure introduced on the diaphragm/membrane via the process/piping. In exemplary embodiments, assembly 100 typically includes a coupling device that is configured to couple assembly 100 to a process having a media for which the pressure is to be measured and to relay pressure of the process media to fill or sensing media 22. For example, the coupling device can be a sanitary-type seal and include a diaphragm (obscured) that deforms in response to pressure exerted by the process media. The process media may be a liquid, a gas, or a combination thereof.

The deformation of the diaphragm due to the external pressure affects the pressure of fill or sensing media 22. The coupling device may be of any appropriate size for coupling assembly 100 to the process, and can be fabricated from stainless steel, plastic, rubber, composite, and/or any other appropriate material. In general, the coupling device may be any appropriate apparatus for coupling a pressure measurement assembly 100 to a process/system having a substance for which pressure is to be measured and for communicating the substance's pressure to a fill or sensing media 22. Instrument 12, 112 couples (via coupling assembly 14) to housing 118 and receives a portion of fill or sensing media 22 for measuring purposes, and outputs the measurement readings via a display or the like.

Figure 4:
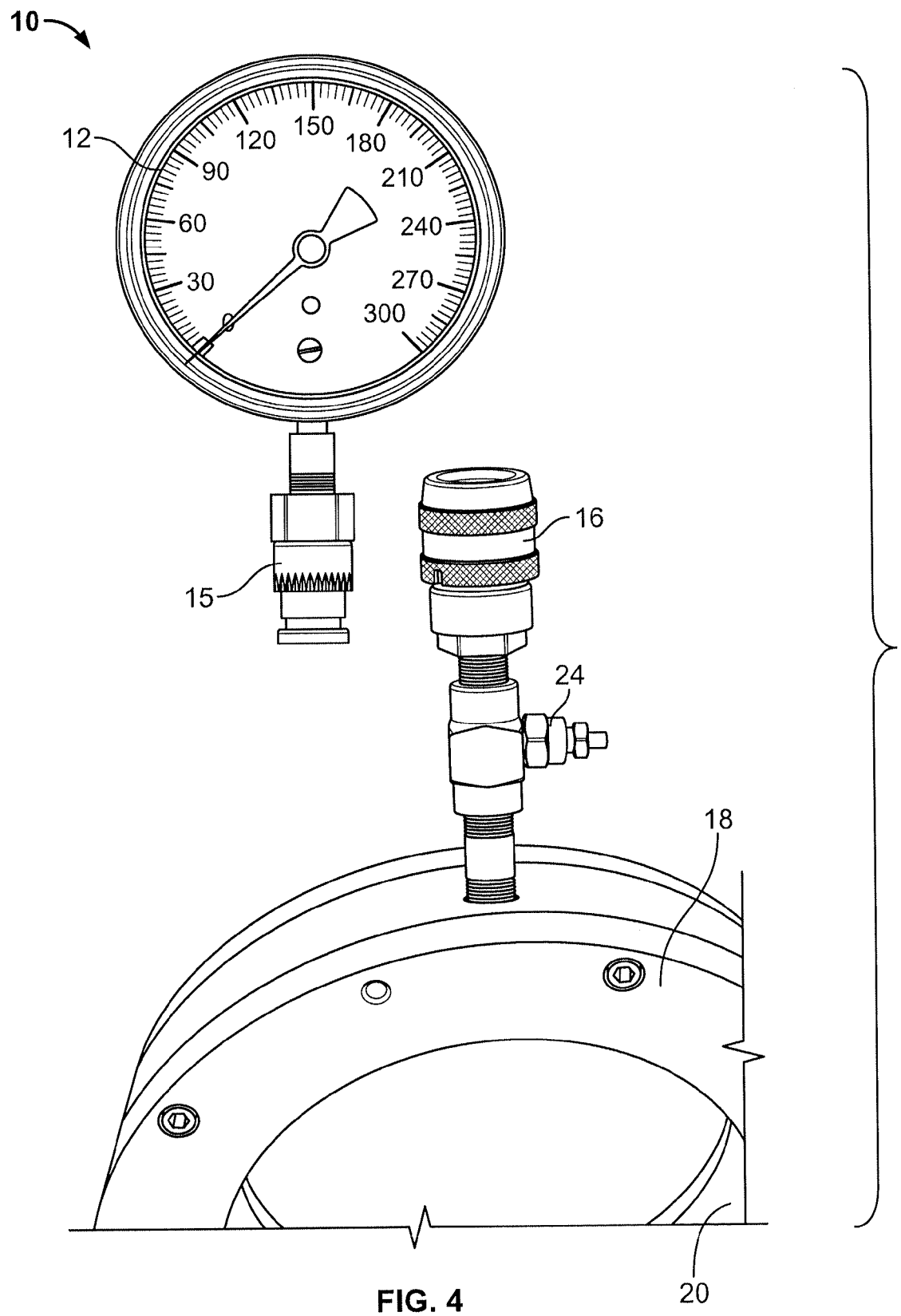
FIG. 4 is a partial front perspective view of another exemplary measuring assembly and measurement instrument according to the present disclosure, prior to assembly.
Figure 5:
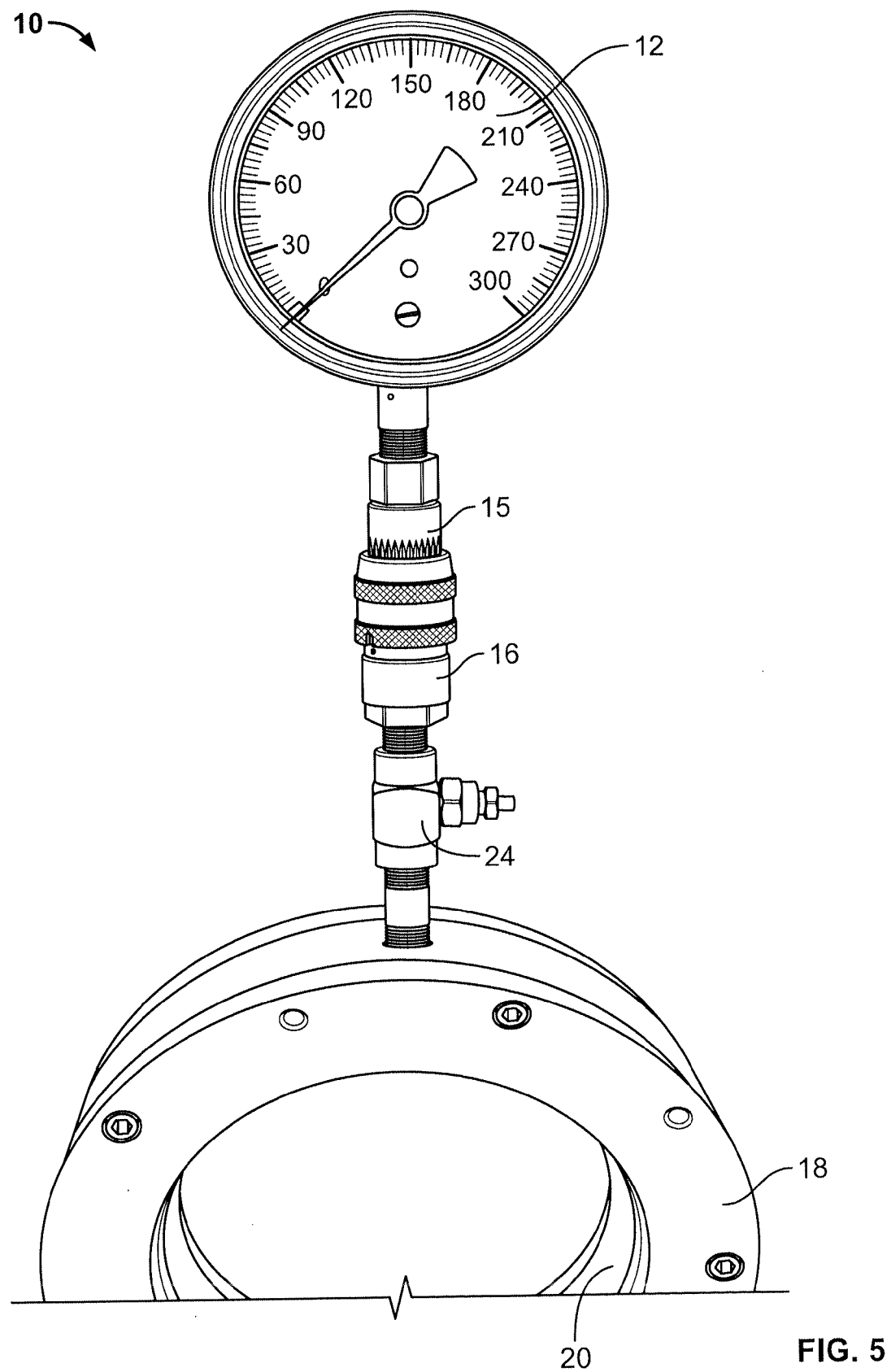
FIG. 5 is a partial front perspective view of the measuring assembly and measurement instrument of FIG. 4, after assembly.
Figure 6:
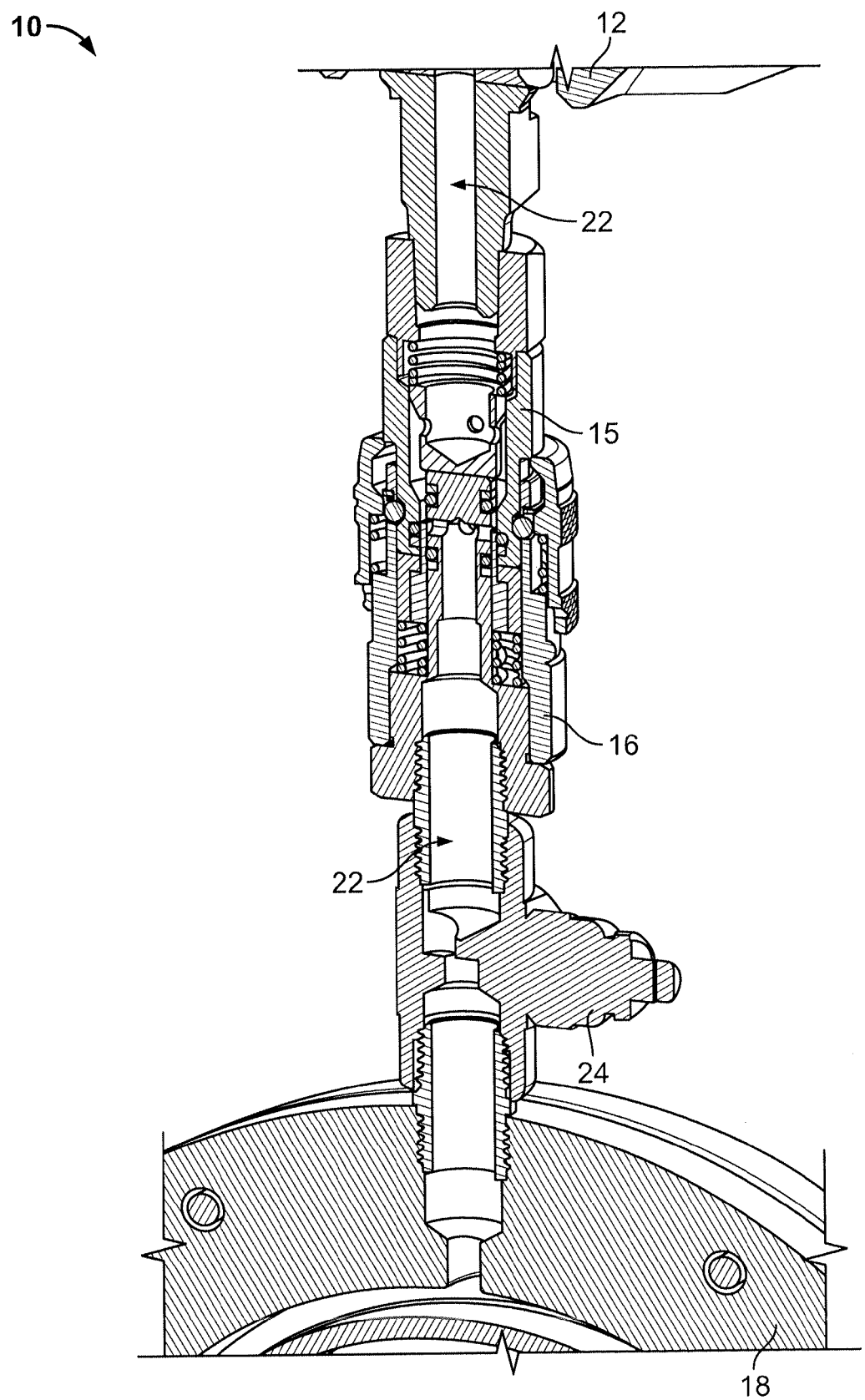
FIG. 6 is a partial cross-sectional view of the assembly of FIG. 5.

In alternative embodiments, FIGS. 4-6 depict a measuring assembly 10 having a needle valve 24, and a coupling assembly 14. For example, measuring assembly 10 can include a needle valve 24 mounted with respect to the housing 18, and a second coupling member 16 mounted with respect to the needle valve. First coupling member 15 (mounted with respect to instrument 12) is configured to releasable couple to second coupling member 16, as described above and below. In exemplary embodiments, coupling assembly 14 functions as the removal/installation assembly for instrument 12, and the needle valve 24 can function as a throttling device (e.g., to minimize process spikes which can potentially damage the instrument 12).

Exemplary coupling assembly 14 takes the form of a dry-break coupling assembly 14, and includes a first dry-break coupling member 15, and a second dry-break coupling member 16, although the present disclosure is not limited thereto. Rather, it is noted that coupling assembly 14 can take a variety of forms.

As discussed further below and as shown in FIGS. 7-9 and 14, exemplary dry-break coupling assembly 14 (e.g., a flush-face dry-break hydraulic quick connect/disconnect coupling assembly 14, available from Parker Snap-tite, Series 71 or the like) includes plumbing connections, and its valve, which has a seal on both sides, is designed to provide sufficient flow while maintaining a low pressure drop when disconnected, as well as preventing fluid loss and air inclusion. It is noted that the coupling assembly 14 can be used in hydraulic or chemical service where cleanliness is required, or applications where spillage cannot be tolerated due to the high value of the fluid or environmental regulations.

In general, second coupling member 16 is plumbed inline with measuring assembly 10, and first coupling member 15 is plumbed inline with instrument 12. In exemplary embodiments, coupling assembly 14 allows the instrument 12 to be removed under pressure without losing fill/sensing fill or sensing media 22 (e.g., fill/sensing fluid) in either the measuring assembly 10 or the instrument 12 (FIG. 1). For example, when first coupling member 15 is mounted to second coupling member 16 (FIG. 2), a user can thereafter remove first coupling member 15 from the second coupling member 16 under pressure without losing fill or sensing media 22 in either the measuring assembly 10 or the instrument 12 (FIG. 1). It is noted that after first coupling member 15 and instrument 12 is removed from member 16/measuring assembly 10, a user can then replace instrument 12/member 15 with another instrument 12, 12', 112. Replacement instrument 12, 12', 112 can be pre-charged to a pre-determined pressure level. For example, replacement instrument 12, 12', 112 can be pre-charged to substantially the same pressure of the previous/removed measurement instrument 12 prior to its removal from assembly 10.

As such, the improved systems/methods of the present disclosure provide for the robust ability to remove a measurement instrument 12, 12', 112 while the process is under pressure (e.g., around 300 psi maximum), and can provide a replacement measurement instrument 12, 12', 112 that is not only pre-filled with the proper fill or sensing media 22, but also "pre-charged" to a desired level (e.g., to substantially the same pressure at which the previous instrument 12, 12', 112 was removed). This thereby substantially eliminates the possibility of improper fills and/or installations of measurement instruments 12, 12', 112 to assembly 10 (or 100), which can cause fluid loss and/or air inclusion that lead to accuracy errors or seal damage. These added benefits of the systems/methods of the present disclosure also provide users with significant operational, manufacturing and/or commercial advantages as a result.

Some other advantageous benefits of the systems/methods of the present disclosure include, without limitation: (i) utilizing the exemplary couplings 14 and related methods with respect to a wide range of measuring/seal assemblies 10, 100, and allowing users to interchange measurement instruments 12, 12', 112 between various types of measuring/seal assemblies 10, 100, (ii) allowing the measurement instrument 12, 12', 112 to be rotated 360 degrees by hand for viewing and measurement taking needs, (iii) existing measurement instruments 12, 12', 112 can be replaced by any other suitable type of instrument 12, 12', 112 with a similar internal volume, (iv) measurement instruments 12, 12', 112 can be removed/attached several times without concern of fluid loss or accuracy impediment, and/or (v) exemplary sleeve-lock features (discussed below) of the couplings 14, 15, 16 prevent unintentional removal of the measurement instruments 12, 12', 112.

It is noted that coupling assembly 14 can be utilized on a wide variety of measuring/seal assemblies 10, 100 (e.g., an isolation ring assembly, such as a wafer design or a bolt-thru design, or an isolation spool assembly, such as a threaded isolation spool or a flanged isolation spool), or a diaphragm seal assembly or the like), and can be utilized on a wide variety of measuring instruments 12, 12', 112 (e.g., mechanical gauges 12, 12', digital gauges 112, transducers, switches, etc.).

Figure 7:
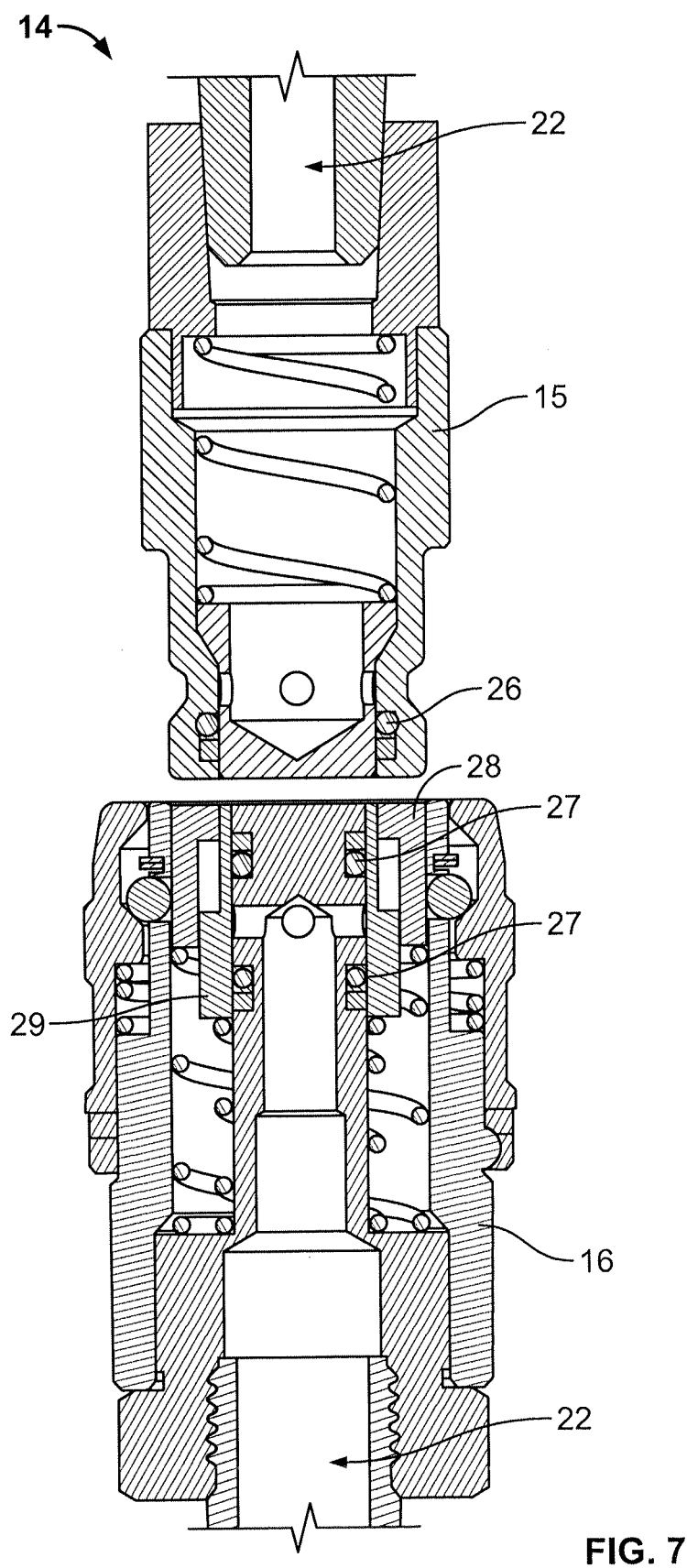
FIG. 7 is a cross-sectional view of coupling members of the assembly of FIG. 1, prior to coupling.

As shown in FIGS. 3 and 6-9, exemplary coupling assembly 14 is shown. FIG. 7 depicts coupling assembly 14 disengaged, with the first coupling member 15 (e.g., the male member 15) and the second coupling member 16 (e.g., the female member 16) being sealed individually with O-ring 26 (member 15) and O-rings 27 (member 16). It is noted that O-ring 26 and/or O-rings 27 can include or be associated with back-up rings or the like (e.g., Teflon back-up rings).

Figure 8:
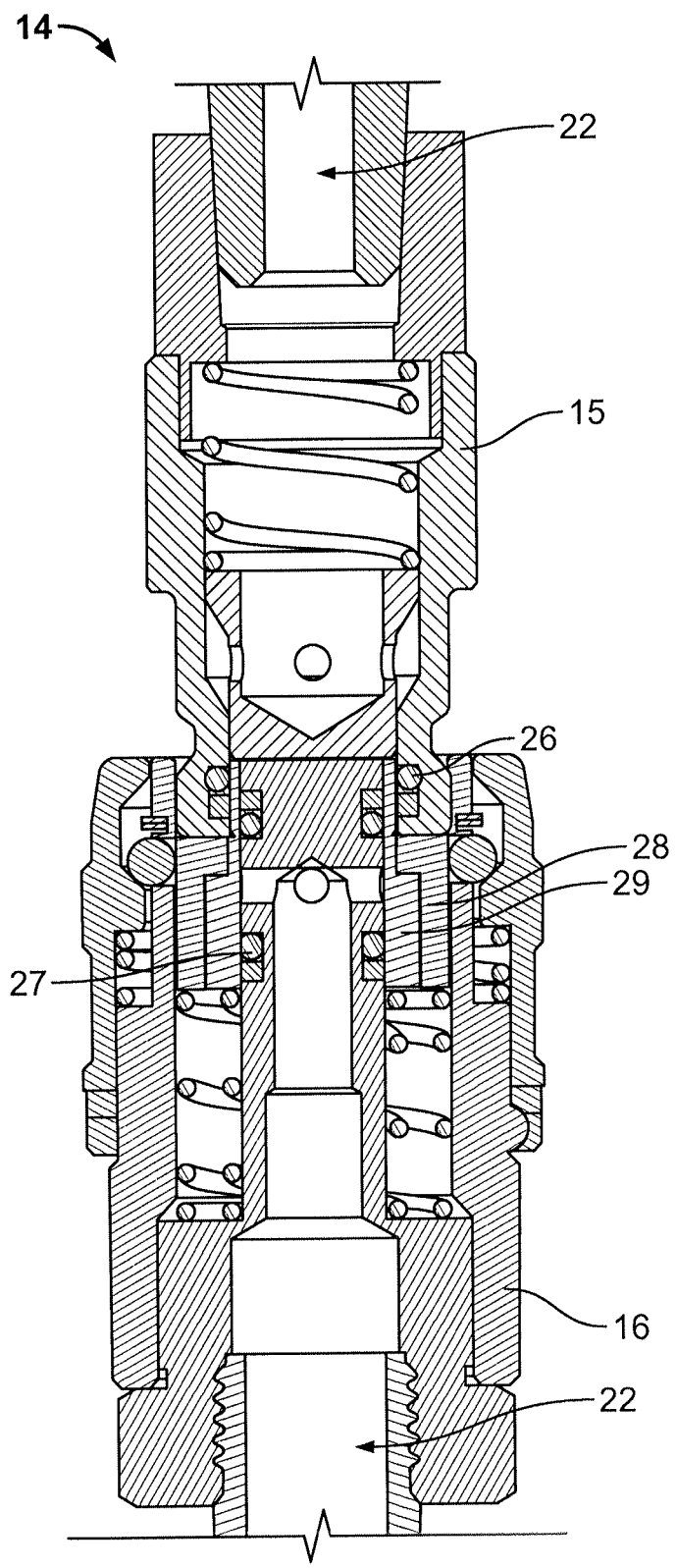
FIG. 8 is a cross-sectional view of the coupling members of FIG. 7, during coupling.
Figure 9:
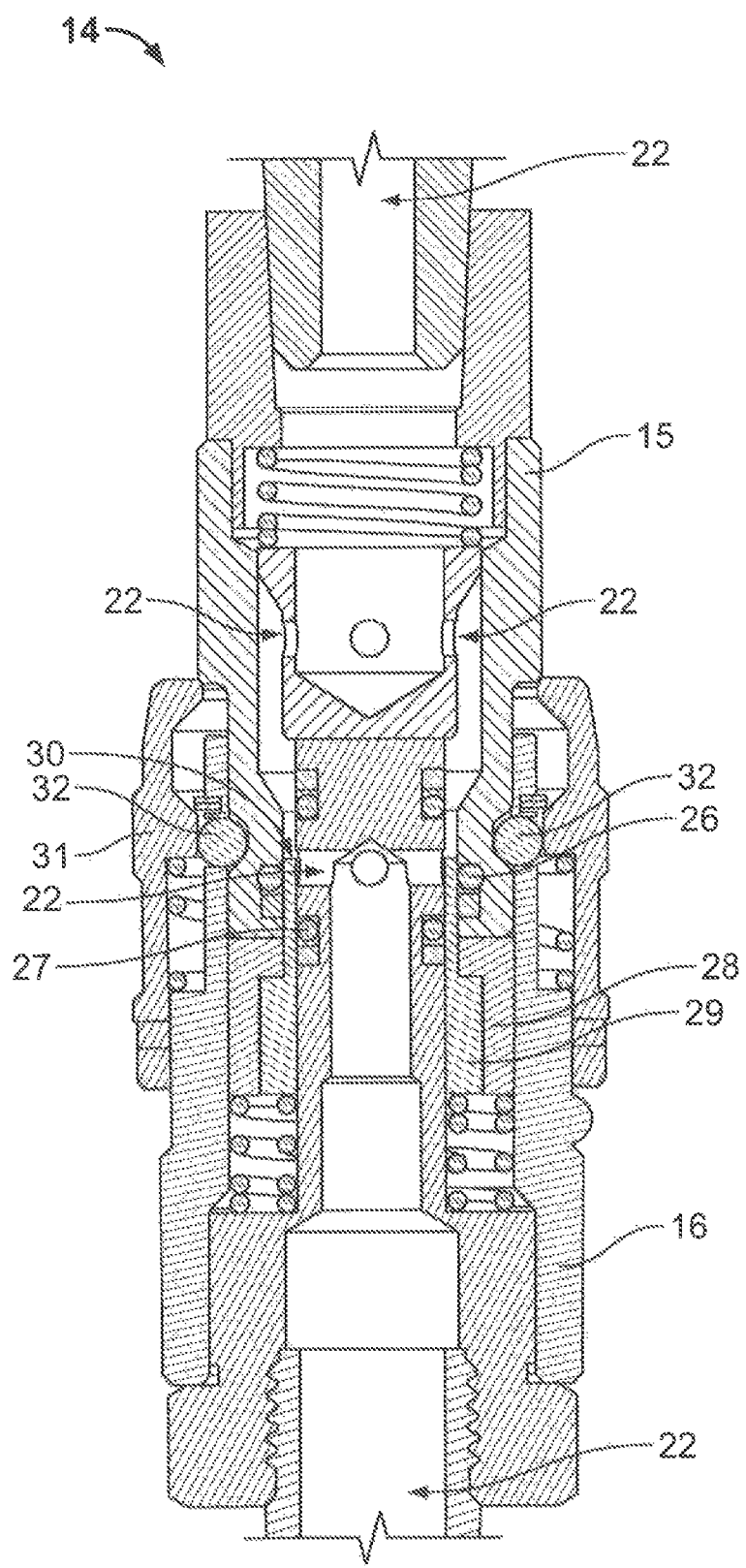
FIG. 9 is a cross-sectional view of the coupling members of FIG. 7, after coupling.
Figure 10:
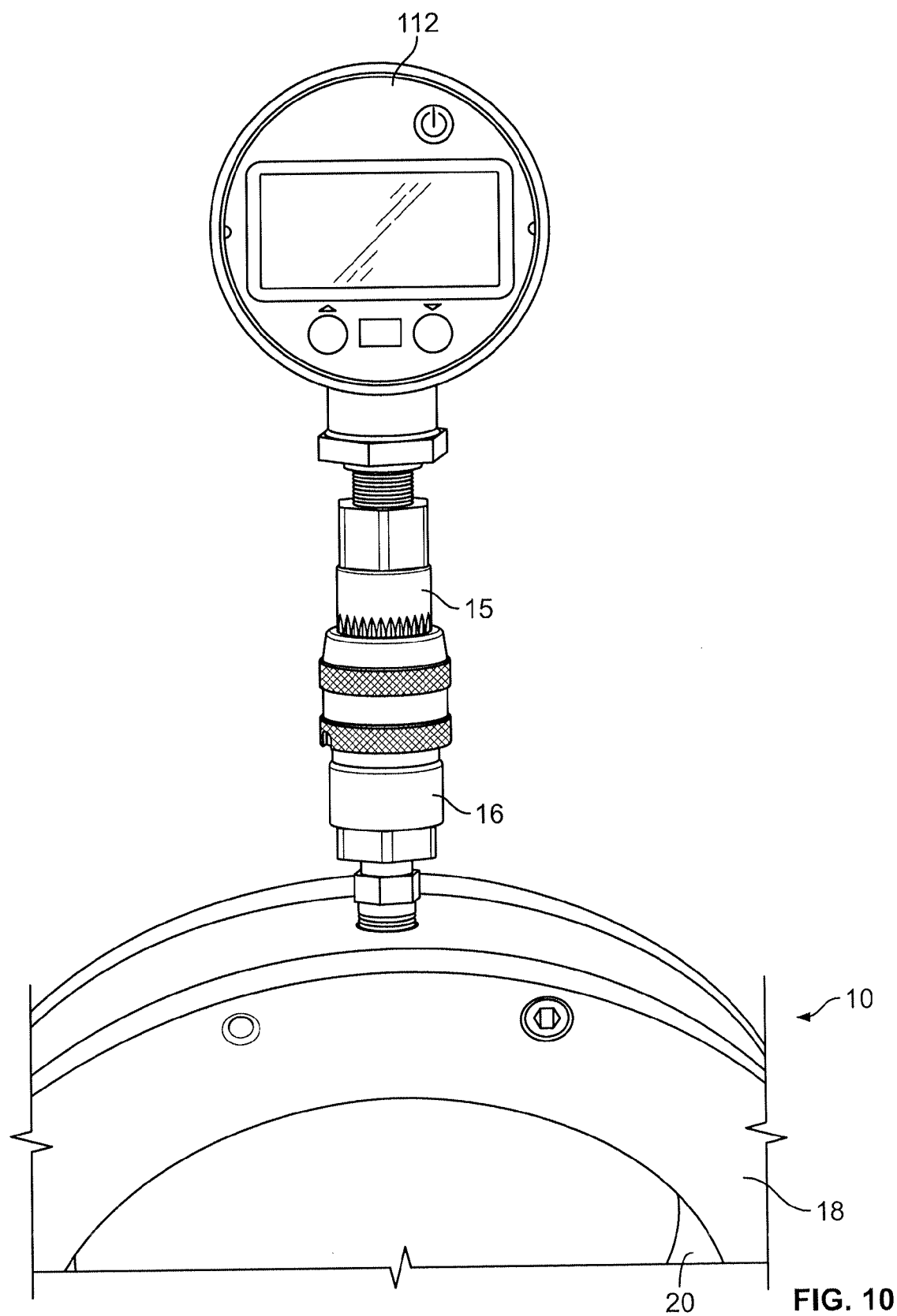
FIG. 10 is a partial front perspective view of another exemplary measuring assembly and measurement instrument according to the present disclosure, after assembly.
Figure 11:
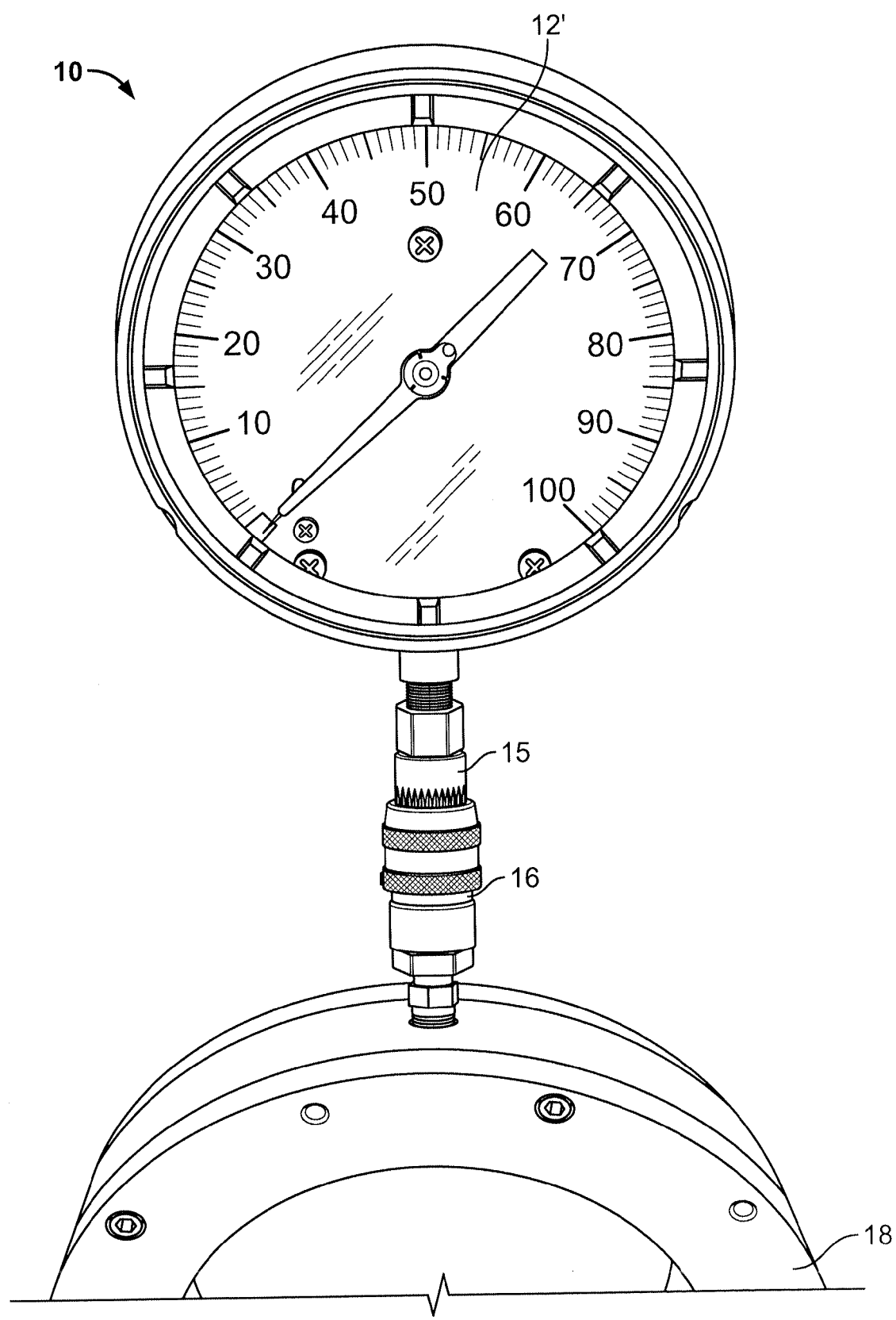
FIG. 11 is a partial front perspective view of another exemplary measuring assembly and measurement instrument according to the present disclosure, after assembly.

As shown in FIGS. 8-9, as the first coupling member 15 (e.g., the male member 15) is pressed/engaged onto/into the second coupling member 16 (e.g., the female member 16), each of the inner plungers 28, 29 begin to depress. Before any of the seals of rings 27 are broken, a mating seal is created on the outer diameter of the plunger 29 (e.g., secondary brass female plunger 29) via ring 26 (FIG. 8).

As shown in FIG. 9, in the final (engaged/coupled) position, the plunger 29 has been depressed enough to expose the communication hole/passage 30, allowing fill or sensing media 22 (from the assembly 10) therethrough, and to instrument 12 for measuring purposes. A relief in the first coupling member 15 allows the outer sleeve 31 of the second coupling member 16 to spring upwards (toward member 15), thereby shifting the ball bearings 32 inward to releasably lock member 15 to member 16. As such, exemplary outer sleeve 31 prevents unintentional removal of the measurement instruments 12, 12', 112 from assembly 10, 100. In exemplary embodiments, assembled coupling 14 prevents unintentional removal of the measurement instruments 12, 12', 112 from assembly 10, 100 by including an external cut in the sleeve 31 which, when aligned with a ball in the body 16, allows the sleeve 31 to be pulled down and released; but when the sleeve 31 is rotated and the cut is no longer aligned with the ball it cannot be pulled down for release.

As such, the present disclosure provides for a highly advantageous method for installing or replacing a process measurement instrument 12, 12', 112 including: operating a process under pressure; providing a first measurement instrument 12, 12', 112 mounted with respect to a measuring assembly 10, 100 positioned for measuring a parameter associated with the process; removing the first measurement instrument 12, 12', 112 from the measuring assembly 10, 100 while the process operates under pressure; replacing the first measurement instrument 12, 12', 112 with a second measurement instrument 12, 12', 112 while the process operates under pressure by installing and mounting the second measurement instrument 12, 12', 112 with respect to the measuring assembly 10, 100; wherein the first measurement instrument 12, 12', 112 includes a first coupling 15 that allows a user to remove the first measurement instrument 12, 12', 112 from the measuring assembly 10, 100 while the process operates under pressure without substantial loss of fill or sensing fluid (e.g., fill or sensing fluid) from the first measurement instrument 12, 12', 112; wherein the second measurement instrument 12, 12', 112 includes a second coupling 15 that allows a user to replace the first measurement instrument 12, 12', 112 by mounting the second measurement instrument 12, 12', 112 with respect to the measuring assembly 10, 100 while the process operates under pressure, the second measurement instrument 12, 12', 112: (i) containing pre-filled fill or sensing media 22 configured to react to pressure of the process, and (ii) pre-charged to a pre-determined pressure level.

In certain embodiments, the first and second couplings 15 are dry-break couplings or the like (e.g., safe quick release dry-break couplings). In exemplary embodiments, the measuring assembly 10, 100 includes a third coupling 16 that allows the user to: (i) couple the first coupling 15 to the third coupling 16 to mount the first measurement instrument 12, 12', 112 with respect to the measuring assembly 10, 100, or (ii) couple the second coupling 15 to the third coupling 16 to mount the second measurement instrument 12, 12', 112 with respect to the measuring assembly 10, 100. In example embodiments, the coupling 16 is a dry-break coupling or the like.

It is noted that the second measurement instrument 12, 12', 112 can be pre-charged to a pre-determined pressure level prior to installing/mounting the second measurement instrument 12, 12', 112. For example and in certain embodiments, the second measurement instrument 12, 12', 112 can be pre-charged to substantially the same pressure of the first measurement instrument 12, 12', 112 (as mounted, and during its operation) prior to removing the first instrument 12, 12', 112 and prior to installing the second measurement instrument 12, 12', 112. The first and second measurement instruments 12, 12', 112 can be pressure measurement instruments (e.g., gauges, digital gauges, transducers, switches, etc.).

The present disclosure will be further described with respect to the following examples; however, the scope of the disclosure is not limited thereby. The following examples illustrate the improved systems/methods of the present disclosure of installing/replacing process measurement instruments to/from process measurement assemblies (e.g., to/from diaphragm seal assemblies or isolation ring assemblies). More particularly, the following examples illustrate the advantageous process measurement assemblies of the present disclosure having couplings that allow a user to replace/install process measurement instruments/devices to/from the process measurement assemblies, and related methods of use.

Use of Quick-Disconnect Couplings with Isolation Seal Assemblies:

Summary of Use:

The following tests represent exemplary scenarios in which the quick-disconnect (QD) coupling may or may not be used, while maintaining seal assembly accuracies (e.g., product accuracy, +/−0.50% of Full Scale Reading).

Proper Assembly Technique:

In general, standard seal-assembly convention teaches that the measurement instrument and the seal assembly be assembled together prior to evacuating and filling. The following exemplary tests show that, in certain embodiments, when using a QD coupling, it is more accurate to fill the isolation ring assembly and measurement instrument separately prior to assembly. In addition, when filled separately, the measurement instrument can be attached to the isolation ring assembly while the isolation ring assembly is in-service under any suitable operating pressure.

Example 1A

Figure 15:
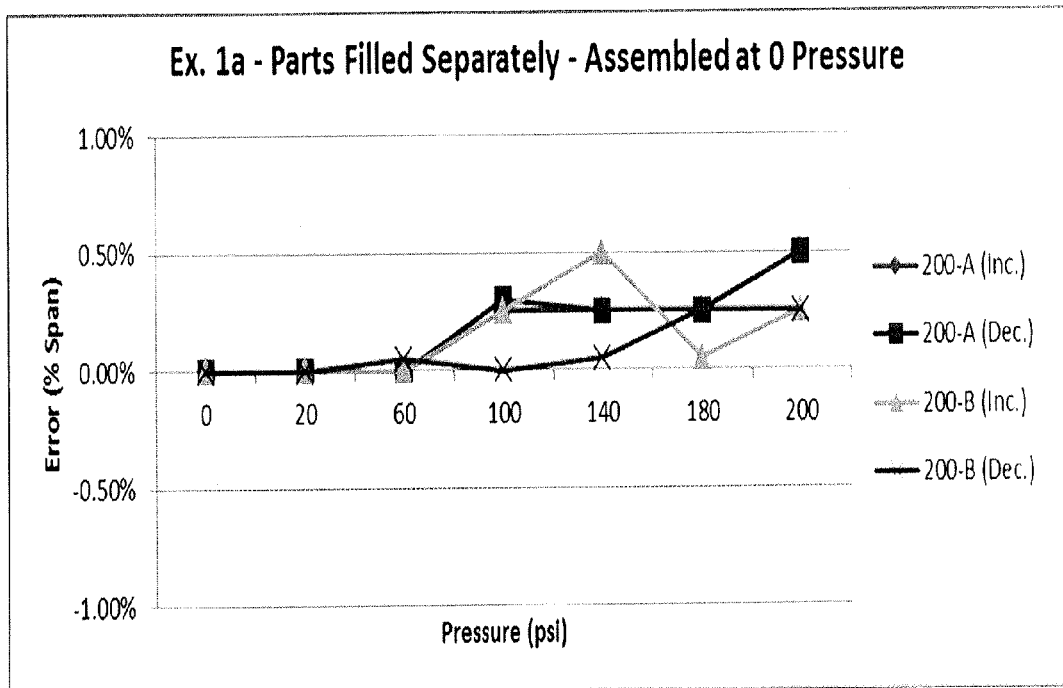
FIG. 15 is a graph for Error versus Pressure for parts/components filled separately and assembled at 0 Pressure.

Evacuate/Fill a 4″ isolation ring assembly (e.g., buna-N bladder material) with silicone oil. Evacuate/Fill a 200 psi process gauge with silicone oil. Assemble the gauge and isolation ring assembly together (not under pressure), and take readings (Table 1). FIG. 15 is a graph for Error versus Pressure for parts/components filled separately and assembled at 0 Pressure.

TABLE 1

| Gauge '200-A' (E199802) Pressure Range (psi) 200 | | | Gauge '200-B' (E199801) Pressure Range (psi) 200 | | | Gauge '200-A' (E199802) | | | | | | |
|---|---|---|---|---|---|---|---|---|---|---|---|---|
| Original Baseline | | | Original Baseline | | | | Baseline | | Tested | | Error | |
| Card. | Inc. | Dec. | Card. | Inc. | Dec. | Card. | Inc. | Dec. | Inc. | Dec. | Inc. | Dec. |
| 0 | 0 | 0 | 0 | 0 | 0 | 0 | 0 | 0 | 0 | 0 | 0.00% | 0.00% |
| 20 | 20 | 20 | 20 | 20 | 20 | 20 | 20 | 20 | 20 | 20 | 0.00% | 0.00% |
| 60 | 60 | 60 | 60 | 60 | 60 | 60 | 60 | 60 | 60 | 60 | 0.00% | 0.00% |
| 100 | 99.5 | 99.9 | 100 | 99.5 | 100 | 100 | 99.5 | 99.9 | 100 | 100.5 | 0.25% | 0.30% |
| 140 | 139.5 | 140 | 140 | 139 | 139.9 | 140 | 139.5 | 140 | 140 | 140.5 | 0.25% | 0.25% |
| 180 | 180 | 180 | 180 | 179.9 | 180 | 180 | 180 | 180 | 180.5 | 180.5 | 0.25% | 0.25% |
| 200 | 200 | 200 | 200 | 200 | 200 | 200 | 200 | 200 | 201 | 201 | 0.50% | 0.50% |

| Gauge '200-A' (E199802) Pressure Range (psi) 200 | | | Gauge '200-B' (E199801) Pressure Range (psi) 200 | | | Gauge '200-B' (E199801) | | | | | | |
|---|---|---|---|---|---|---|---|---|---|---|---|---|
| Tested Readings | | | Tested Readings | | | | Baseline | | Tested | | Error | |
| Card. | Inc. | Dec. | Card. | Inc. | Dec. | Card. | Inc. | Dec. | Inc. | Dec. | Inc. | Dec. |
| 0 | 0 | 0 | 0 | 0 | 0 | 0 | 0 | 0 | 0 | 0 | 0.00% | 0.00% |
| 20 | 20 | 20 | 20 | 20 | 20 | 20 | 20 | 20 | 20 | 20 | 0.00% | 0.00% |
| 60 | 60 | 60 | 60 | 60 | 60.1 | 60 | 60 | 60 | 60 | 60.1 | 0.00% | 0.05% |
| 100 | 100 | 100.5 | 100 | 100 | 100 | 100 | 99.5 | 100 | 100 | 100 | 0.25% | 0.00% |
| 140 | 140 | 140.5 | 140 | 140 | 140 | 140 | 139 | 139.9 | 140 | 140 | 0.50% | 0.05% |
| 180 | 180.5 | 180.5 | 180 | 180 | 180.5 | 180 | 179.9 | 180 | 180 | 180.5 | 0.05% | 0.25% |
| 200 | 201 | 201 | 200 | 200.5 | 200.5 | 200 | 200 | 200 | 200.5 | 200.5 | 0.25% | 0.25% |

Example 1B

Figure 16:
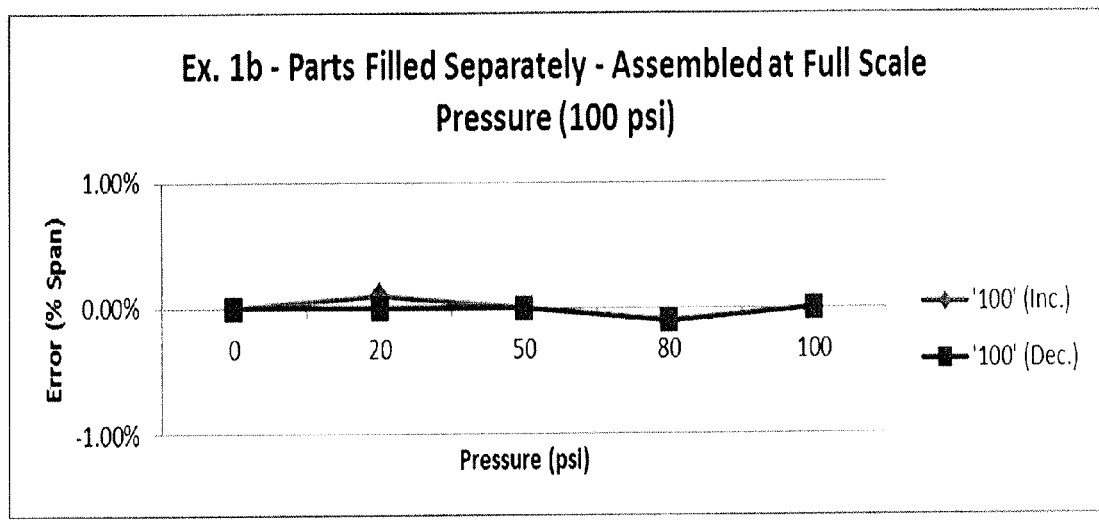
FIG. 16 is a graph for Error versus Pressure for parts/components filled separately and assembled at Full Scale Pressure (100 psi)

Evacuate/Fill a 4" isolation ring (e.g., buna-N bladder material) with silicone oil. Evacuate/Fill a 100 psi process pressure gauge with silicone oil. Clamp isolation ring in fixture and pressurize to full scale (100 psi). Assemble the gauge to the ring (while under 100 psi pressure) and take readings (Table 2). FIG. 16 is a graph for Error versus Pressure for parts/components filled separately and assembled at Full Scale Pressure (100 psi).

Example 2

Figure 17:
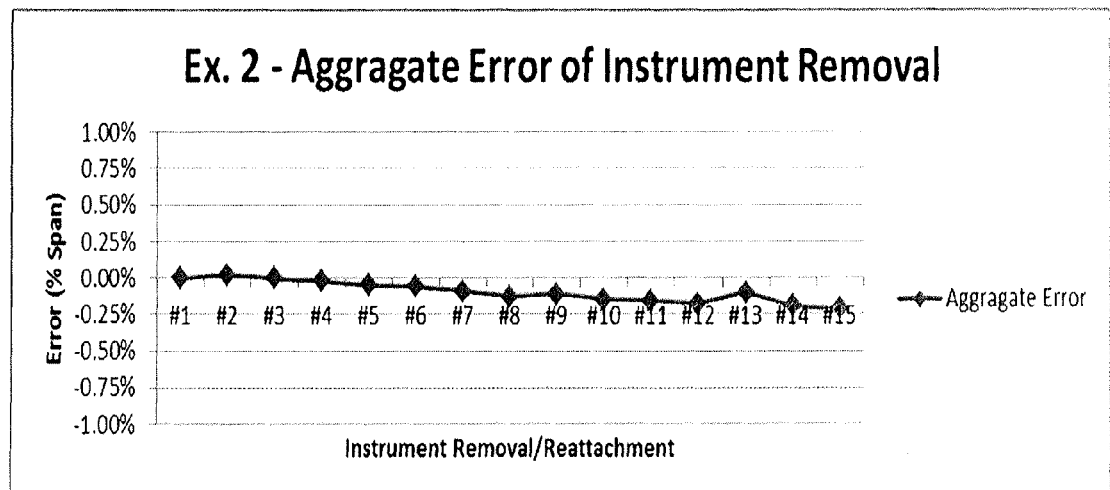
FIG. 17 is a graph showing aggregate error of instrument removal.

Evacuate/Fill a 6" isolation ring (e.g., buna-N bladder material) with silicone oil. Evacuate/Fill a 100 psi digital pressure gauge with silicone oil. Assemble the gauge and ring together (not under pressure). Pressurize the assembly to mid-scale (50 psi) and take readings (Table 3). Remove and re-attach the gauge several times, taking readings at each interval (Table 3). FIG. 17 is a graph showing aggregate error of instrument removal.

TABLE 2

| Gauge '100' Pressure Range (psi) 100 | | | Gauge '100' Pressure Range (psi) 100 | | | Gauge '100' | | | | | | |
|---|---|---|---|---|---|---|---|---|---|---|---|---|
| Baseline Readings | | | Tested Readings | | | | Baseline | | Tested | | Error | |
| Card. | Inc. | Dec. | Card. | Inc. | Dec. | Card. | Inc. | Dec. | Inc. | Dec. | Inc. | Dec. |
| 0 | 0 | 0 | 0 | 0 | 0 | 0 | 0 | 0 | 0 | 0 | 0.00% | 0.00% |
| 20 | 19.7 | 19.7 | 20 | 19.8 | 19.7 | 20 | 19.7 | 19.7 | 19.8 | 19.7 | 0.10% | 0.00% |
| 50 | 49.9 | 49.9 | 50 | 49.9 | 49.9 | 50 | 49.9 | 49.9 | 49.9 | 49.9 | 0.00% | 0.00% |
| 80 | 80 | 80 | 80 | 79.9 | 79.9 | 80 | 80 | 80 | 79.9 | 79.9 | −0.10% | −0.10% |
| 100 | 100 | 100 | 100 | 100 | 100 | 100 | 100 | 100 | 100 | 100 | 0.00% | 0.00% |

Conclusion:

The tests shown in Examples 1A and 1B demonstrate that the instruments' accuracy is not hindered by filling the isolation ring and instrument separately prior to assembly. Additionally, these tests show that the instrument can be assembled initially under any suitable pressure (e.g., 300 psi MAX, as specified by the QD coupling manufacturer).

Removing Instrument Under Static Pressure:

Once the instrument has been assembled to the isolation ring, it can be removed/re-attached several times while under constant pressure. The following test shows that this can be done while maintaining the stated accuracy.

TABLE 3

| | Pressure Range (psi) 100 | | |
|---|---|---|---|
| Removal/ Reattachment | Gauge Reading | Ind. Difference (%) | Total % Error (Span) |
| #1 | 50.23 | 0.00% | 0.00% |
| #2 | 50.25 | −0.02% | 0.02% |
| #3 | 50.23 | 0.02% | 0.00% |
| #4 | 50.21 | 0.02% | −0.02% |
| #5 | 50.18 | 0.03% | −0.05% |
| #6 | 50.17 | 0.01% | −0.06% |
| #7 | 50.14 | 0.03% | −0.09% |
| #8 | 50.1 | 0.04% | −0.13% |

TABLE 3-continued

Pressure Range (psi) 100

| Removal/<br>Reattachment | Gauge<br>Reading | Ind. Difference<br>(%) | Total % Error<br>(Span) |
|---|---|---|---|
| #9  | 50.12 | −0.02% | −0.11% |
| #10 | 50.08 |  0.04% | −0.15% |
| #11 | 50.07 |  0.01% | −0.16% |
| #12 | 50.05 |  0.02% | −0.18% |
| #13 | 50.13 | −0.08% | −0.10% |
| #14 | 50.04 |  0.09% | −0.19% |
| #15 | 50.02 |  0.02% | −0.21% |

Average Error per Removal: 0.015%

Conclusion:

The test shown in Ex. 2 demonstrates that the instruments' accuracy is not hindered by removing and re-attaching the instrument to the isolation ring several times.

Removal Instrument Under Varying Pressures:

Once the instrument has been assembled to the isolation ring, it can be removed/re-attached while under any suitable pressure (e.g., 300 psi MAX). The following test shows that this can be done while maintaining the stated accuracy.

Example 3A

Figure 18:
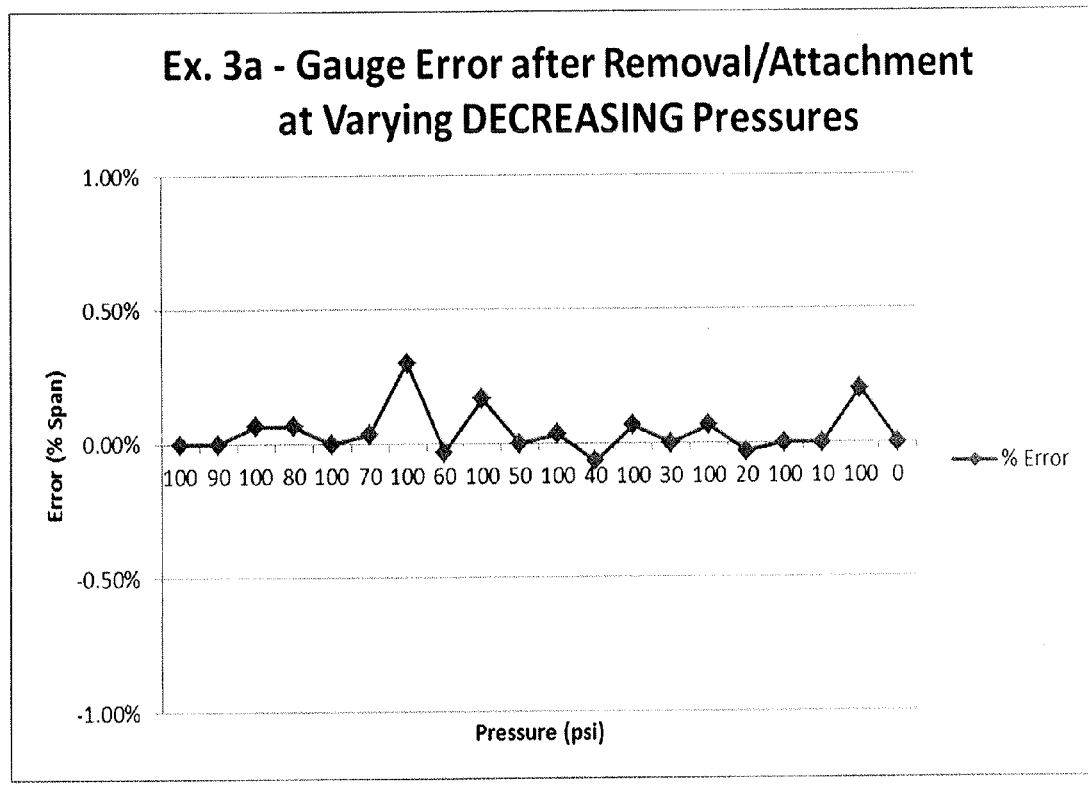
FIG. 18 is a graph showing gauge error after removal/attachment at varying decreasing pressures.

Evacuate/Fill a 6" isolation ring (e.g., buna-N bladder material) with silicone oil. Evacuate/Fill a 300 psi process pressure gauge with silicone oil. Assemble the gauge and ring together (not under pressure). Take baseline readings at about 10 psi intervals up to about 100 psi. Remove/attach the instrument at intervals of 10 psi, decreasing from 100 psi, and take readings (Table 4). FIG. 18 is a graph showing gauge error after removal/attachment at varying decreasing pressures.

TABLE 4

| Cardinal | Tested | Baseline | % Error |
|---|---|---|---|
| 100 | 97   | 97   |  0.00% |
|  90 | 87.9 | 87.9 |  0.00% |
| 100 | 97.2 | 97   |  0.07% |
|  80 | 78   | 77.8 |  0.07% |
| 100 | 97   | 97   |  0.00% |
|  70 | 68   | 67.9 |  0.03% |
| 100 | 97.9 | 97   |  0.30% |
|  60 | 57.9 | 58   | −0.03% |
| 100 | 97.5 | 97   |  0.17% |
|  50 | 47.9 | 47.9 |  0.00% |
| 100 | 97.1 | 97   |  0.03% |
|  40 | 37.8 | 38   | −0.07% |
| 100 | 97.2 | 97   |  0.07% |
|  30 | 27.9 | 27.9 |  0.00% |
| 100 | 97.2 | 97   |  0.07% |
|  20 | 17.9 | 18   | −0.03% |
| 100 | 97   | 97   |  0.00% |
|  10 |  7.9 |  7.9 |  0.00% |
| 100 | 97.6 | 97   |  0.20% |
|   0 |  0   |  0   |  0.00% |

TABLE 4-continued

| Cardinal | Tested | Baseline | % Error |
|---|---|---|---|

Example 3B

Figure 19:
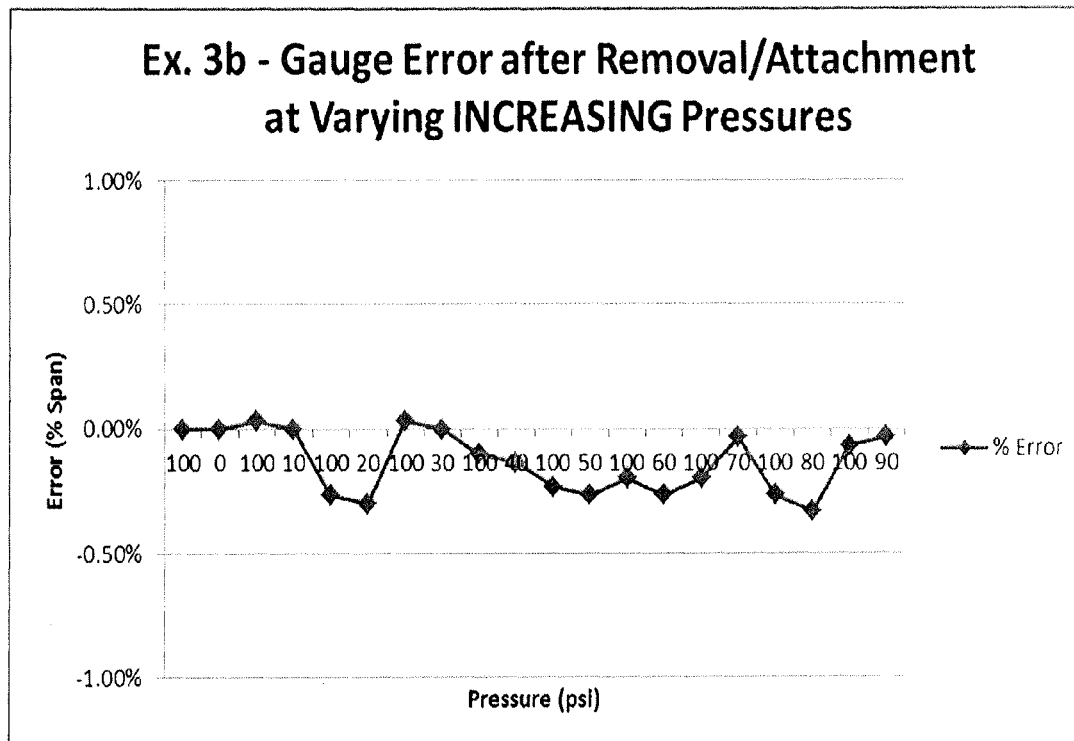
FIG. 19 is a graph showing gauge error after removal/attachment at varying increasing pressures.

Same procedure as Example 3A, except with increasing pressure (Table 5). FIG. 19 is a graph showing gauge error after removal/attachment at varying increasing pressures.

TABLE 5

| Cardinal | Tested | Baseline | % Error |
|---|---|---|---|
| 100 | 97.8 | 97.8 |  0.00% |
|   0 |  0   |  0   |  0.00% |
| 100 | 97.9 | 97.8 |  0.03% |
|  10 |  7.8 |  7.8 |  0.00% |
| 100 | 97   | 97.8 | −0.27% |
|  20 | 17   | 17.9 | −0.30% |
| 100 | 97.9 | 97.8 |  0.03% |
|  30 | 27.9 | 27.9 |  0.00% |
| 100 | 97.5 | 97.8 | −0.10% |
|  40 | 37.5 | 37.9 | −0.13% |
| 100 | 97.1 | 97.8 | −0.23% |
|  50 | 47   | 47.8 | −0.27% |
| 100 | 97.2 | 97.8 | −0.20% |
|  60 | 57.2 | 58   | −0.27% |
| 100 | 97.2 | 97.8 | −0.20% |
|  70 | 67.8 | 67.9 | −0.03% |
| 100 | 97   | 97.8 | −0.27% |
|  80 | 77   | 78   | −0.33% |
| 100 | 97.6 | 97.8 | −0.07% |
|  90 | 87.8 | 87.9 | −0.03% |

Conclusion:

The tests shown in Examples 3A and 3B demonstrate that the instruments' accuracy is not hindered by removing the instrument at one pressure and re-attaching it at a different pressure; in both increasing and decreasing directions.

Replacement Instrument:

An instrument can be replaced while the isolation ring is in-service. In order to do this, the replacement gauge should have been "pre-charged" at the removal pressure while it was assembled to the same size isolation ring. The following tests demonstrate how this can be done while maintain the stated accuracy.

Example 4A

Figure 20:
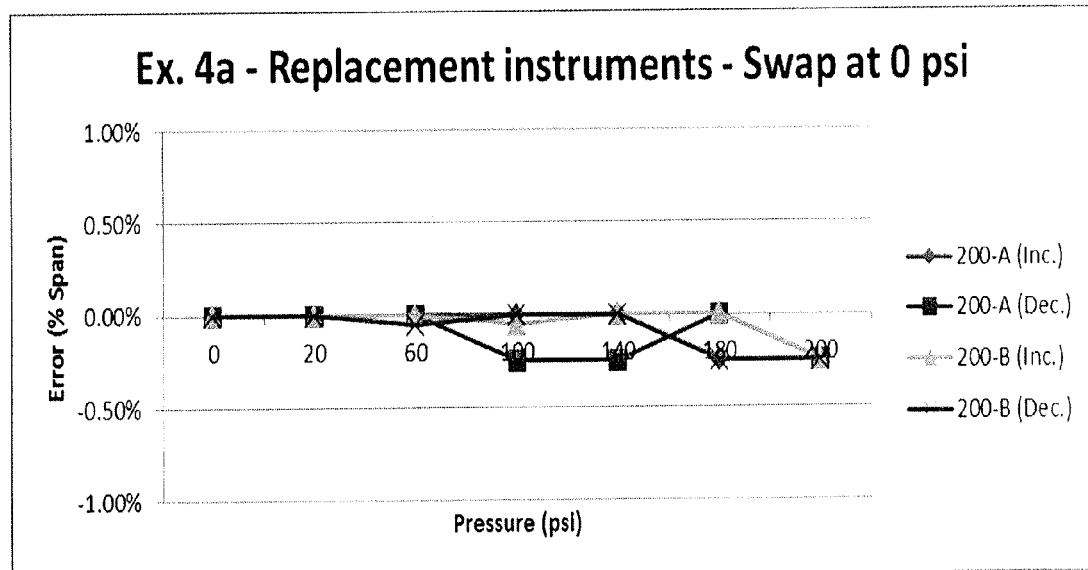
FIG. 20 is a graph for Error versus Pressure for replacement instruments—swap at 0 psi.

Evacuate/Fill a 6" isolation ring (e.g., buna-N bladder material) with silicone oil. Evacuate/Fill a 200 psi process pressure gauge with silicone oil. Evacuate/Fill a different 6" isolation ring (e.g., buna-N bladder material) with silicone oil. Evacuate/Fill a different 200 psi process pressure gauge with silicone oil. Take readings on both gauges (Table 6). Swap gauges at 0 psi pressure and take readings (Table 6). FIG. 20 is a graph for Error versus Pressure for replacement instruments—swap at 0 psi.

TABLE 6

| Gauge '200-A' (E199802)<br>Range (psi) 200 | | | Gauge '200-B' (E199801)<br>Range (psi) 200 | | | Gauge '200-A' | | | | | | |
|---|---|---|---|---|---|---|---|---|---|---|---|---|
| New Baseline | | | New Baseline | | | Baseline | | | Tested | | Error | |
| Card. | Inc. | Dec. | Card. | Inc. | Dec. | Card. | Inc. | Dec. | Inc. | Dec. | Inc. | Dec. |
|   0 |   0 |   0   |   0 |   0 |   0   |   0 |   0 |   0   |   0 |   0 | 0.00% |  0.00% |
|  20 |  20 |  20   |  20 |  20 |  20   |  20 |  20 |  20   |  20 |  20 | 0.00% |  0.00% |
|  60 |  60 |  60   |  60 |  60 |  60.1 |  60 |  60 |  60   |  60 |  60 | 0.00% |  0.00% |
| 100 | 100 | 100.5 | 100 | 100 | 100   | 100 | 100 | 100.5 | 100 | 100 | 0.00% | −0.25% |

TABLE 6-continued

| 140 | 140 | 140.5 | 140 | 140 | 140 | 140 | 140 | 140.5 | 140 | 140 | 0.00% | −0.25% |
| 180 | 180.5 | 180.5 | 180 | 180 | 180.5 | 180 | 180.5 | 180.5 | 180 | 180.5 | −0.25% | 0.00% |
| 200 | 201 | 201 | 200 | 200.5 | 200.5 | 200 | 201 | 201 | 200.5 | 200.5 | −0.25% | −0.25% |

| Gauge '200-A' (E199802) Range (psi) 200 | | | Gauge '200-B' (E199801) Range (psi) 200 | | | Gauge '200-B' | | | | | | |
|---|---|---|---|---|---|---|---|---|---|---|---|---|
| New Tested | | | New Tested | | | | | | Baseline | Tested | Error | |
| Card. | Inc. | Dec. | Card. | Inc. | Dec. | Card. | Inc. | Dec. | Inc. | Dec. | Inc. | Dec. |
| 0 | 0 | 0 | 0 | 0 | 0 | 0 | 0 | 0 | 0 | 0 | 0.00% | 0.00% |
| 20 | 20 | 20 | 20 | 20 | 20 | 20 | 20 | 20 | 20 | 20 | 0.00% | 0.00% |
| 60 | 60 | 60 | 60 | 60 | 60 | 60 | 60 | 60.1 | 60 | 60 | 0.00% | −0.05% |
| 100 | 100 | 100 | 100 | 99.9 | 100 | 100 | 100 | 100 | 99.9 | 100 | −0.05% | 0.00% |
| 140 | 140 | 140 | 140 | 140 | 140 | 140 | 140 | 140 | 140 | 140 | 0.00% | 0.00% |
| 180 | 180 | 180.5 | 180 | 180 | 180 | 180 | 180 | 180.5 | 180 | 180 | 0.00% | −0.25% |
| 200 | 200.5 | 200.5 | 200 | 200 | 200 | 200 | 200.5 | 200.5 | 200 | 200 | −0.25% | −0.25% |

Example 4B

Figure 21:
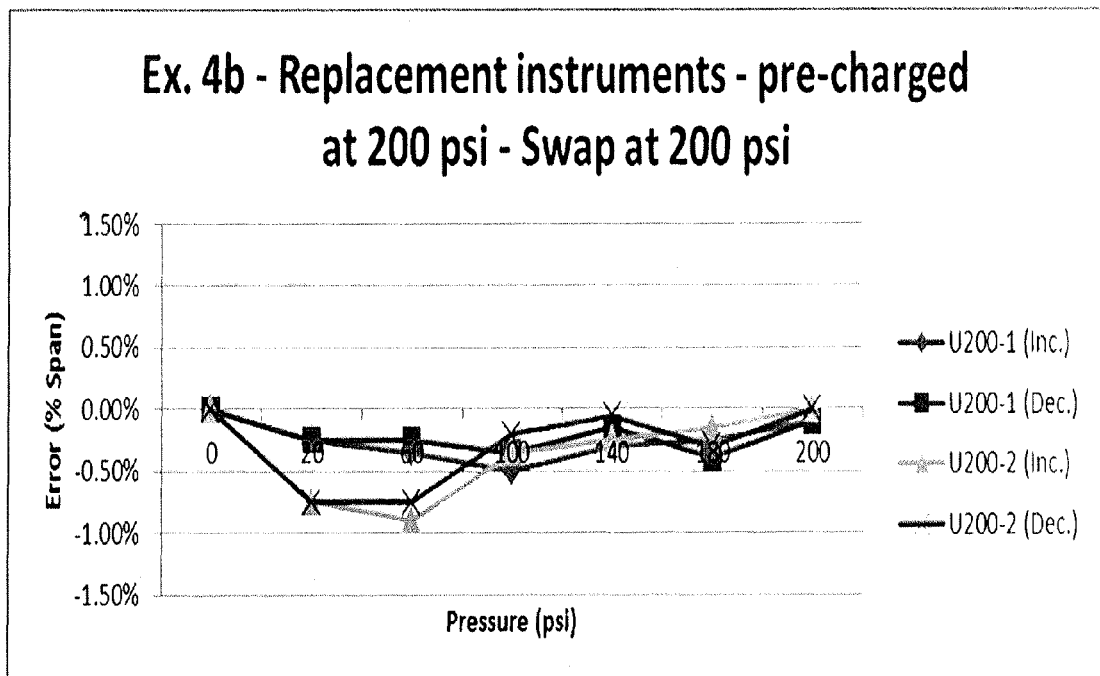
FIG. 21 is a graph for Error versus Pressure for replacement instruments—pre-charged at 200 psi—swap at 200 psi.

Evacuate/Fill a 6" isolation ring (e.g., buna-N bladder material) with silicone oil. Evacuate/Fill a 200 psi process pressure gauge with silicone oil. Evacuate/Fill a different 6" isolation ring (e.g., buna-N bladder material) with silicone oil. Evacuate/Fill a different 200 psi process pressure gauge with silicone oil. Assemble each gauge to corresponding ring and take readings (Table 7). Swap gauges while each is at 200 psi pressure and take readings (Table 7). FIG. 21 is a graph for Error versus Pressure for replacement instruments—pre-charged at 200 psi—swap at 200 psi.

Example 4C

Figure 22:
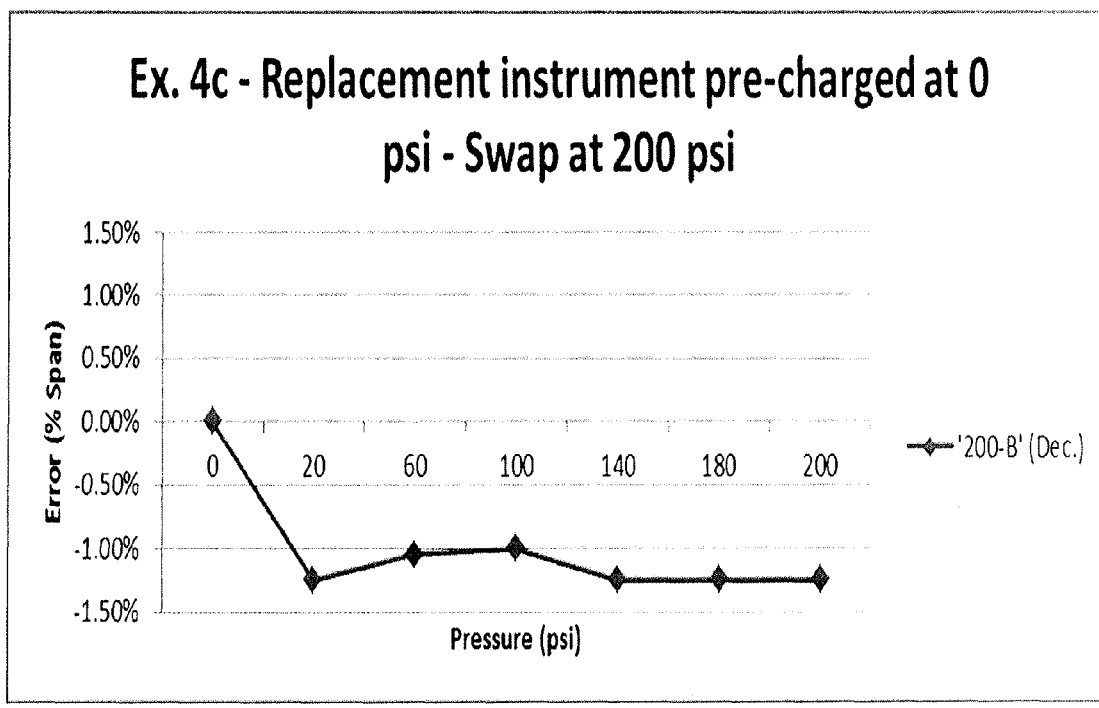
FIG. 22 is a graph for Error versus Pressure for replacement instruments—pre-charged at 0 psi—swap at 200 psi.

Evacuate/Fill a 6" isolation ring (e.g., buna-N bladder material) with silicone oil. Evacuate/Fill a 200 psi process pressure gauge with silicone oil. Assemble gauge to ring and take readings (Table 8). Evacuate/Fill a different 200 psi process pressure gauge with silicone oil. Pressurize 1st gauge to 200 psi and remove. While under 200 psi pressure, attach the 2nd gauge to ring and take readings (Table 8). FIG. 22 is a graph for Error versus Pressure for replacement instruments—pre-charged at 0 psi—swap at 200 psi.

TABLE 7

| Gauge 'U200-1' Range (psi) 200 | | | Gauge 'U200-2' Range (psi) 200 | | | Gauge 'U200-1' | | | | | | |
|---|---|---|---|---|---|---|---|---|---|---|---|---|
| New Baseline | | | New Baseline | | | | | | Baseline | Tested | Error | |
| Card. | Inc. | Dec. | Card. | Inc. | Dec. | Card. | Inc. | Dec. | Inc. | Dec. | Inc. | Dec. |
| 0 | 0 | 0 | 0 | 0 | 0 | 0 | 0 | 0 | 0 | 0 | 0.00% | 0.00% |
| 20 | 20.5 | 20.5 | 20 | 23 | 23 | 20 | 20.5 | 20.5 | 20 | 20 | −0.25% | −0.25% |
| 60 | 61.5 | 62 | 60 | 63.8 | 64 | 60 | 61.5 | 62 | 60.8 | 61.5 | −0.35% | −0.25% |
| 100 | 101.5 | 102.2 | 100 | 103.6 | 104.3 | 100 | 101.5 | 102.2 | 100.5 | 101.5 | −0.50% | −0.35% |
| 140 | 141.6 | 142.3 | 140 | 143.5 | 144 | 140 | 141.6 | 142.3 | 141 | 142 | −0.30% | −0.15% |
| 180 | 181.5 | 182 | 180 | 182.2 | 182.7 | 180 | 181.5 | 182 | 181 | 181.2 | −0.25% | −0.40% |
| 200 | 201.2 | 201.2 | 200 | 201.5 | 201.5 | 200 | 201.2 | 201.2 | 201 | 201 | −0.10% | −0.10% |

| Gauge 'U200-1' Range (psi) 200 | | | Gauge 'U200-2' Range (psi) 200 | | | Gauge 'U200-2' | | | | | | |
|---|---|---|---|---|---|---|---|---|---|---|---|---|
| New Tested | | | New Tested | | | | | | Baseline | Tested | Error | |
| Card. | Inc. | Dec. | Card. | Inc. | Dec. | Card. | Inc. | Dec. | Inc. | Dec. | Inc. | Dec. |
| 0 | 0 | 0 | 0 | 0 | 0 | 0 | 0 | 0 | 0 | 0 | 0.00% | 0.00% |
| 20 | 20 | 20 | 20 | 21.5 | 21.5 | 20 | 23 | 23 | 21.5 | 21.5 | −0.75% | −0.75% |
| 60 | 60.8 | 61.5 | 60 | 62 | 62.5 | 60 | 63.8 | 64 | 62 | 62.5 | −0.90% | −0.75% |
| 100 | 100.5 | 101.5 | 100 | 102.9 | 103.9 | 100 | 103.6 | 104.3 | 102.9 | 103.9 | −0.35% | −0.20% |
| 140 | 141 | 142 | 140 | 143 | 143.9 | 140 | 143.5 | 144 | 143 | 143.9 | −0.25% | −0.05% |
| 180 | 181 | 181.2 | 180 | 181.9 | 182.1 | 180 | 182.2 | 182.7 | 181.9 | 182.1 | −0.15% | −0.30% |
| 200 | 201 | 201 | 200 | 201.5 | 201.5 | 200 | 201.5 | 201.5 | 201.5 | 201.5 | 0.00% | 0.00% |

TABLE 8

Gauge '200-B' (E199801)
Range (psi) 200

| Card. | Baseline Dec. | Tested Dec. | Error Dec. |
|---|---|---|---|
| 0 | 0 | 0 | 0.00% |
| 20 | 20 | 17.5 | −1.25% |
| 60 | 60.1 | 58 | −1.05% |
| 100 | 100 | 98 | −1.00% |
| 140 | 140 | 137.5 | −1.25% |
| 180 | 180.5 | 178 | −1.25% |
| 200 | 200.5 | 198 | −1.25% |

Example 4D

Figure 23:
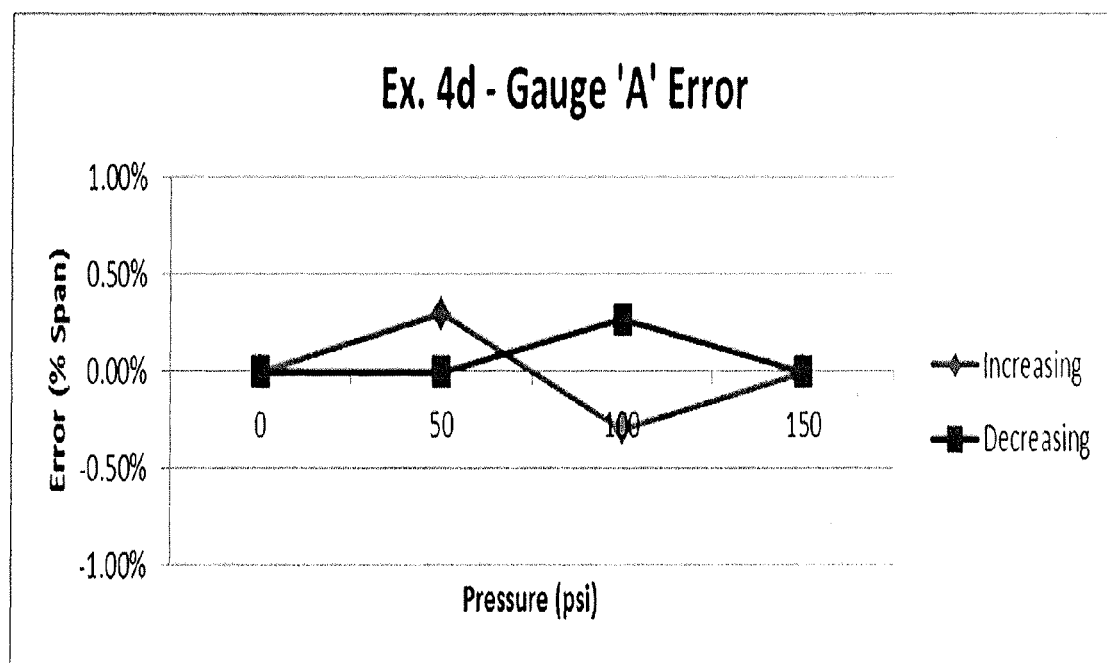
FIG. 23 is a graph for Error versus Pressure for Gauge 'A' Error.
Figure 24:
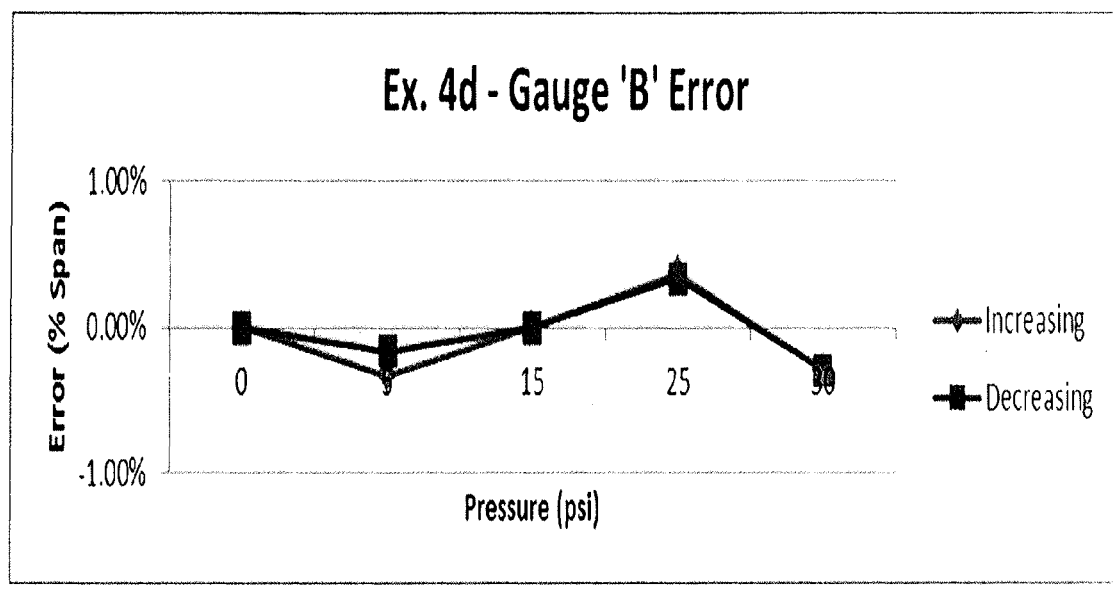
FIG. 24 is a graph for Error versus Pressure for Gauge 'B' Error.

Evacuate/Fill a 6" isolation ring (e.g., buna-N bladder material) with silicone oil. Evacuate/Fill a 300 psi process pressure gauge with silicone oil. Assemble gauge to ring and take readings (Table 9). Evacuate/Fill a different 6" isolation ring (e.g., buna-N bladder material) with silicone oil. Evacuate/Fill a 30 psi process pressure gauge with silicone oil. Assemble gauge to ring and take readings (Table 9). Swap gauges at 0 psi pressure and take readings (Table 9). FIG. 23 is a graph for Error versus Pressure for Gauge 'A' Error. FIG. 24 is a graph for Error versus Pressure for Gauge 'B' Error.

TABLE 9

| 6" Buna Range (psi) 300 | | | 6" Buna Range (psi) 30 | | |
|---|---|---|---|---|---|
| Gauge 'A' | Baseline | | Gauge 'B' | Baseline | |
| Card. | Inc. | Dec. | Card. | Inc. | Dec. |
| 0 | 0 | 0 | 0 | 0 | 0 |
| 50 | 47 | 50 | 5 | 4.6 | 4.75 |
| 100 | 97.9 | 99 | 15 | 14.39 | 14.59 |
| 150 | 147.8 | 147.8 | 25 | 24.19 | 24.4 |
|  |  |  | 30 | 29.39 | 29.39 |

| Gauge 'B' | Tested | | Error | | Gauge 'A' | Tested | | Error | |
|---|---|---|---|---|---|---|---|---|---|
| Card. | Inc. | Dec. | Inc. | Dec. | Card. | Inc. | Dec. | Inc. | Dec. |
| 0 | 0 | 0 | 0.00% | 0.00% | 0 | 0 | 0 | 0.00% | 0.00% |
| 5 | 4.5 | 4.7 | −0.33% | −0.17% | 50 | 47.9 | 50 | 0.30% | 0.00% |
| 15 | 14.39 | 14.59 | 0.00% | 0.00% | 100 | 97 | 99.8 | −0.30% | 0.27% |
| 25 | 24.3 | 24.5 | 0.37% | 0.33% | 150 | 147.8 | 147.8 | 0.00% | 0.00% |
| 30 | 29.3 | 29.3 | −0.30% | −0.30% |  |  |  |  |  |

Conclusion:

The tests shown in Examples 4A-4D demonstrate that the instruments' accuracy is not hindered by replacing the instrument with another instrument of any suitable pressure range, given that the replacement instrument has been "pre-charged" to substantially the same pressure at which the original instrument was removed, while assembled to the same size isolation ring.

Replacement Instruments—Pre-Charged on Varying Size Seals:

As shown in the previous tests, an instrument can be replaced while the isolation ring is in-service under certain conditions. The following tests support the importance of these conditions.

Example 5A

Figure 25:
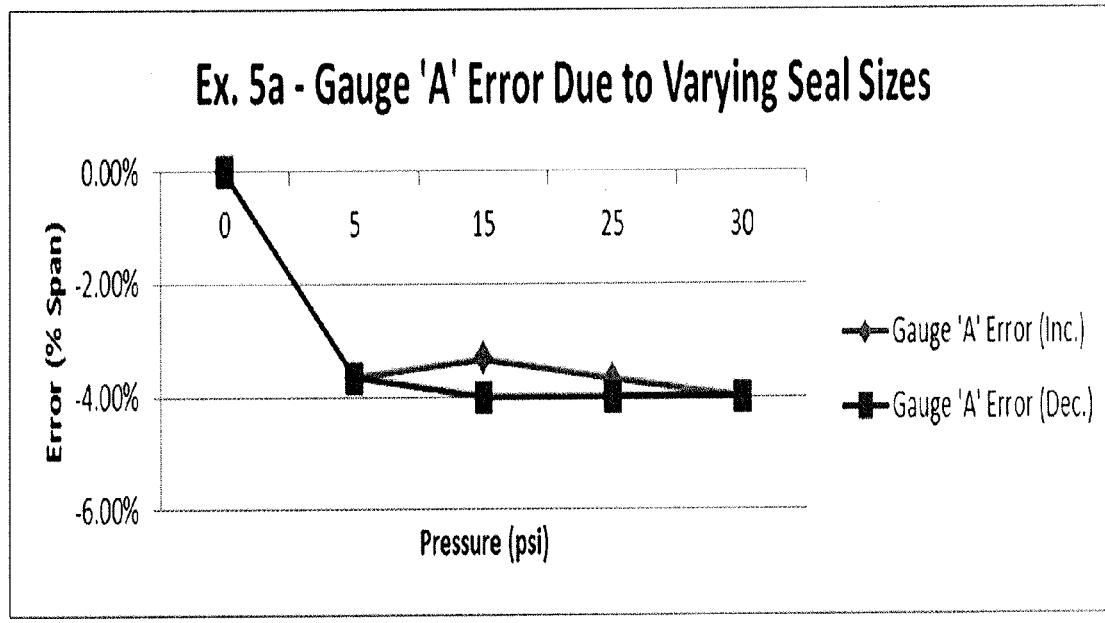
FIG. 25 is a graph for Error versus Pressure for Gauge 'A' Error due to varying seal sizes.

Evacuate/Fill a 2" isolation ring (e.g., Viton bladder material) with silicone oil. Evacuate/Fill a 30 psi process pressure gauge with silicone oil. Assemble gauge to ring and take readings (Table 10). Evacuate/Fill a 10" isolation ring (e.g., Viton bladder material) with silicone oil. Evacuate/Fill a different 30 psi process pressure gauge with silicone oil. Assemble gauge to ring and take readings (Table 10). Swap gauges at 0 psi pressure and take readings (Table 10). FIG. 25 is a graph for Error versus Pressure for Gauge 'A' Error due to varying seal sizes.

TABLE 10

| 2" Viton Range (psi) 30 | | | 10" Viton Range (psi) 30 | | | 10" Viton | | | | |
|---|---|---|---|---|---|---|---|---|---|---|
| Gauge 'A' | Baseline | | Gauge 'B' | Baseline | | Gauge 'A' | Tested | | Error | |
| Card. | Inc. | Dec. | Card. | Inc. | Dec. | Card. | Inc. | Dec. | Inc. | Dec. |
| 0 | 0 | 0 | 0 | 0 | 0 | 0 | 0 | 0 | 0.00% | 0.00% |
| 5 | 4.81 | 4.8 | 5 | 4.8 | 5 | 5 | 3.7 | 3.9 | −3.67% | −3.67% |
| 15 | 14.6 | 14.65 | 15 | 14.7 | 15 | 15 | 13.7 | 13.8 | −3.33% | −4.00% |
| 25 | 24.4 | 24.5 | 25 | 24.7 | 25 | 25 | 23.59 | 23.8 | −3.70% | −4.00% |
| 30 | 29.37 | 29.37 | 30 | 29.7 | 29.7 | 30 | 28.5 | 28.5 | −4.00% | −4.00% |

Example 5B

Figure 26:
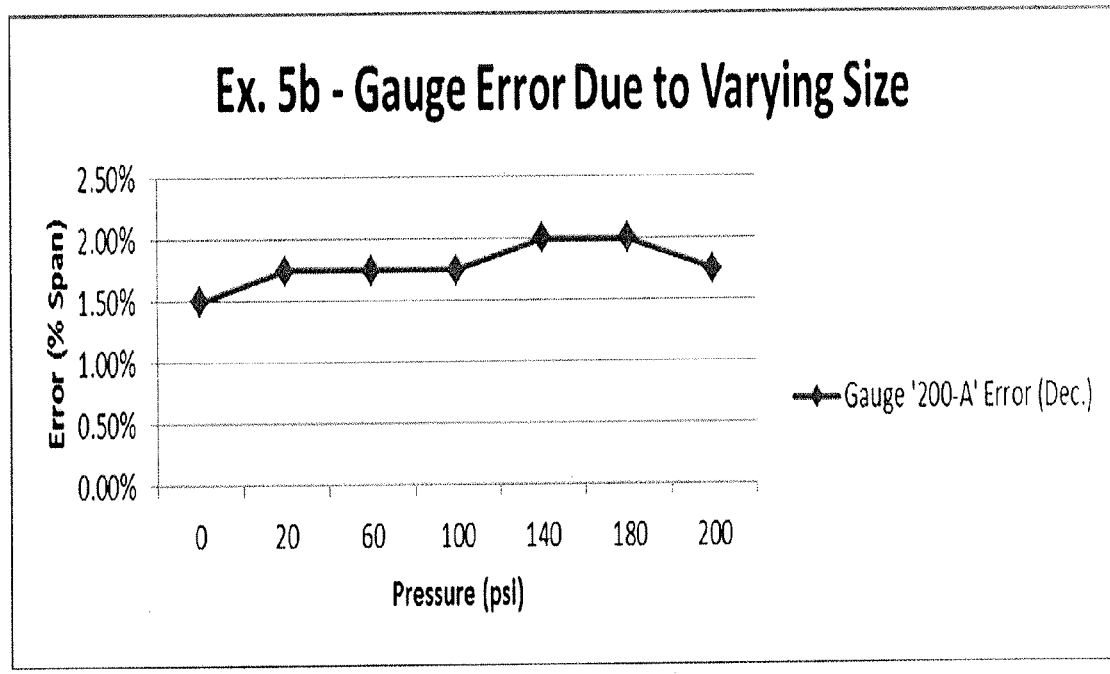
FIG. 26 is a graph for Error versus Pressure for Gauge Error due to varying size.

Evacuate/Fill a 4" isolation ring (e.g., buna-N bladder material) with silicone oil. Evacuate/Fill a 200 psi process pressure gauge with silicone oil. Assemble gauge to ring and take readings (Table 11). Evacuate/Fill a 100 series diaphragm seal with silicone oil. Evacuate/Fill a different 200 psi process pressure gauge with silicone oil. Assemble gauge to ring and take readings (Table 11). Swap gauges while each is at 200 psi pressure and take readings (Table 11). FIG. 26 is a graph for Error versus Pressure for Gauge Error due to varying size.

TABLE 11

| Gauge '200-A' (E199802) | | | | Gauge '200-A' | | | |
|---|---|---|---|---|---|---|---|
| Pressure Range (psi) 200 Baseline | | | Tested | Baseline | | Tested | Error |
| Card. | Inc. | Dec. | Dec. | Card. | Dec. | Dec. | Dec. |
| 0 | mid | mid | 3 | 0 | 0 | 3 | 1.50% |
| 20 | 20 | 20 | 23.5 | 20 | 20 | 23.5 | 1.75% |
| 60 | 60 | 60 | 63.5 | 60 | 60 | 63.5 | 1.75% |
| 100 | 99.9 | 100 | 103.5 | 100 | 100 | 103.5 | 1.75% |
| 140 | 140 | 140 | 144 | 140 | 140 | 144 | 2.00% |
| 180 | 180 | 180 | 184 | 180 | 180 | 184 | 2.00% |
| 200 | 200.5 | 200.5 | 204 | 200 | 200.5 | 204 | 1.75% |

Conclusion:

The tests shown in Examples 5A and 5B demonstrate that the instruments' accuracy can be, in certain embodiments, hindered by replacing the instrument with another instrument which was "pre-charged" alone or on a difference size isolation ring (or seal).

Although the systems and methods of the present disclosure have been described with reference to exemplary embodiments thereof, the present disclosure is not limited to such exemplary embodiments and/or implementations. Rather, the devices, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for replacing a process measurement instrument comprising:
    operating a process under pressure;
    providing a first measurement instrument mounted with respect to a measuring assembly positioned for measuring a parameter associated with the process;
    removing the first measurement instrument from the measuring assembly while the process operates under pressure;
    replacing the first measurement instrument with a second measurement instrument while the process operates under pressure by installing and mounting the second measurement instrument with respect to the measuring assembly;
    wherein the first measurement instrument includes a first coupling that allows a user to remove the first measurement instrument from the measuring assembly while the process operates under pressure without substantial loss of fill or sensing media from the first measurement instrument;
    wherein the second measurement instrument includes a second coupling that allows the user to replace the first measurement instrument by mounting the second measurement instrument with respect to the measuring assembly while the process operates under pressure, the second measurement instrument: (i) containing pre-filled sensing media configured to react to pressure of the process, and (ii) pre-charged to a pre-determined pressure level.

2. The method of claim 1, wherein the second measurement instrument is pre-charged to substantially the same pressure of the first measurement instrument prior to installing the second measurement instrument.

3. The method of claim 1, wherein the first and second measurement instruments are pressure measurement instruments.

4. The method of claim 1, wherein the first and second measurement instruments are selected from the group consisting of gauges, digital gauges, transducers and switches.

5. The method of claim 1, wherein the first and second couplings are dry-break couplings.

6. The method of claim 5, wherein the measuring assembly includes a third coupling that allows the user to: (i) couple the first coupling to the third coupling to mount the first measurement instrument with respect to the measuring assembly, or (ii) couple the second coupling to the third coupling to mount the second measurement instrument with respect to the measuring assembly; and
    wherein the third coupling is a dry-break coupling.

7. The method of claim 1, wherein the fill or sensing fluid of the first measurement instrument is configured to react to pressure of the process when the first measurement instrument is mounted with respect to the measuring assembly.

8. The method of claim 1, wherein the measuring assembly is a seal assembly.

9. The method of claim 1, wherein the measuring assembly is an isolation ring assembly or an isolation spool assembly.

10. The method of claim 1, wherein the measuring assembly is a diaphragm seal assembly.

11. The method of claim 1, wherein the process operating under pressure is a flow stream process, the flow stream process having a solids content.

12. The method of claim 1, wherein the fill or sensing media is a sensing fluid; and
    wherein the pre-filled sensing media is a sensing fluid.

13. The method of claim 1 further comprising a needle valve mounted with respect to the measuring assembly, and a third coupling mounted with respect to the needle valve; and
    wherein the third coupling allows the user to: (i) couple the first coupling to the third coupling to mount the first measurement instrument with respect to the measuring assembly, or (ii) couple the second coupling to the third coupling to mount the second measurement instrument with respect to the measuring assembly.

14. The method of claim 1, wherein the fill or sensing media includes glycerin or silicone.

15. The method of claim 1, wherein the measuring assembly includes a housing with a flexible member exposed to the process, the housing containing fill or sensing media; and
    wherein the fill or sensing media of the housing is configured to react to pressure introduced to the flexible member.

16. A method for replacing a process measurement instrument comprising:
   operating a process under pressure;
   providing a first pressure measurement instrument mounted with respect to a measuring assembly positioned for measuring pressure associated with the process;
   removing the first pressure measurement instrument from the measuring assembly while the process operates under pressure;
   replacing the first pressure measurement instrument with a second pressure measurement instrument while the process operates under pressure by installing and mounting the second pressure measurement instrument with respect to the measuring assembly;
   wherein the first pressure measurement instrument includes a first coupling that allows a user to remove the first pressure measurement instrument from the measuring assembly while the process operates under pressure without substantial loss of fill or sensing media from the first pressure measurement instrument;
   wherein the second pressure measurement instrument includes a second coupling that allows the user to replace the first pressure measurement instrument by mounting the second pressure measurement instrument with respect to the measuring assembly while the process operates under pressure, the second pressure measurement instrument: (i) containing pre-filled sensing media configured to react to pressure of the process, and (ii) pre-charged to a pre-determined pressure level;
   wherein the fill or sensing media of the first measurement instrument is configured to react to pressure of the process when the first measurement instrument is mounted with respect to the measuring assembly;
   wherein the first and second couplings are dry-break couplings;
   wherein the measuring assembly includes a third coupling that allows the user to: (i) couple the first coupling to the third coupling to mount the first pressure measurement instrument with respect to the measuring assembly, or (ii) couple the second coupling to the third coupling to mount the second pressure measurement instrument with respect to the measuring assembly; and
   wherein the third coupling is a dry-break coupling.

17. The method of claim 16 further comprising a needle valve mounted with respect to the measuring assembly, and
   wherein the third coupling is mounted with respect to the needle valve.

18. The method of claim 16, wherein the measuring assembly includes a housing with a flexible member exposed to the process, the housing containing fill or sensing media; and
   wherein the fill or sensing media of the housing is configured to react to pressure introduced to the flexible member.

19. A method for replacing a process measurement instrument comprising:
   operating a flow stream process under pressure, the flow stream process having a solids content;
   providing a first pressure measurement instrument mounted with respect to a seal assembly positioned for measuring pressure associated with the flow stream process;
   removing the first pressure measurement instrument from the seal assembly while the flow stream process operates under pressure;
   replacing the first pressure measurement instrument with a second pressure measurement instrument while the flow stream process operates under pressure by installing and mounting the second pressure measurement instrument with respect to the seal assembly;
   wherein the first pressure measurement instrument includes a first coupling that allows a user to remove the first pressure measurement instrument from the seal assembly while the flow stream process operates under pressure without substantial loss of fill or sensing media from the first pressure measurement instrument;
   wherein the second pressure measurement instrument includes a second coupling that allows the user to replace the first pressure measurement instrument by mounting the second pressure measurement instrument with respect to the seal assembly while the flow stream process operates under pressure, the second pressure measurement instrument: (i) containing pre-filled sensing media configured to react to pressure of the flow stream process, and (ii) pre-charged to a pre-determined pressure level;
   wherein the seal assembly includes a housing with a flexible member exposed to the flow stream process, the housing containing fill or sensing media;
   wherein the fill or sensing media of the housing is configured to react to pressure introduced to the flexible member;
   wherein the fill or sensing media of the first measurement instrument is configured to react to pressure of the flow stream process when the first measurement instrument is mounted with respect to the seal assembly;
   wherein the seal assembly includes a third coupling that allows the user to: (i) couple the first coupling to the third coupling to mount the first pressure measurement instrument with respect to the seal assembly, or (ii) couple the second coupling to the third coupling to mount the second pressure measurement instrument with respect to the seal assembly; and
   wherein the first, second and third couplings are dry-break couplings; and
   wherein the second pressure measurement instrument is pre-charged to substantially the same pressure of the first pressure measurement instrument prior to installing the second pressure measurement instrument.

20. The method of claim 19 further comprising a needle valve mounted with respect to the seal assembly, and
   wherein the third coupling is mounted with respect to the needle valve.

21. The method of claim 19, wherein the seal assembly includes a housing with a flexible member exposed to the process, the housing containing fill or sensing media; and
   wherein the fill or sensing media of the housing is configured to react to pressure introduced to the flexible member.

* * * * *